US012091831B2

(12) United States Patent
Vehmeijer et al.

(10) Patent No.: US 12,091,831 B2
(45) Date of Patent: Sep. 17, 2024

(54) PILE UPENDING AND HOLDING SYSTEM AND METHOD

(71) Applicant: ITREC B.V., Schiedam (NL)

(72) Inventors: Terence Willem August Vehmeijer, Schiedam (NL); Hendrikus Jacobus Weterings, Schiedam (NL); Stefan Cornelis Van Ruyven, Schiedam (NL); Rene Corneille Losiriai Boelens, Schiedam (NL)

(73) Assignee: ITREC B.V., Schiedam (NL)

( * ) Notice: Subject to any disclaimer, the term of this patent is extended or adjusted under 35 U.S.C. 154(b) by 206 days.

(21) Appl. No.: 17/762,898

(22) PCT Filed: Sep. 23, 2020

(86) PCT No.: PCT/EP2020/076537
§ 371 (c)(1),
(2) Date: Mar. 23, 2022

(87) PCT Pub. No.: WO2021/058544
PCT Pub. Date: Apr. 1, 2021

(65) Prior Publication Data
US 2022/0356668 A1 Nov. 10, 2022

(30) Foreign Application Priority Data

Sep. 23, 2019 (NL) ...................................... 2023880
Aug. 5, 2020 (NL) ...................................... 2026215

(51) Int. Cl.
*E02D 13/04* (2006.01)
*B63B 27/10* (2006.01)
(Continued)

(52) U.S. Cl.
CPC .............. *E02D 13/04* (2013.01); *B63B 27/10* (2013.01); *B63B 35/00* (2013.01); *E02D 7/00* (2013.01); *E02D 15/08* (2013.01)

(58) Field of Classification Search
CPC ........... E02D 13/04; E02D 7/00; E02D 15/08; E02D 27/425; F03D 13/25;
(Continued)

(56) References Cited

U.S. PATENT DOCUMENTS 11,008,726 B2 * 5/2021 Vehmeijer ................ F16L 1/207
2012/0076591 A1 * 3/2012 Peters ...................... E02D 13/04
405/228

(Continued)

FOREIGN PATENT DOCUMENTS

EP      3 517 479 A1   7/2019
WO   WO 2018/117846 A1   6/2018
(Continued)

OTHER PUBLICATIONS

Dutch Search Report, issued in Priority Application No. 2023880, dated May 7, 2020.
(Continued)

*Primary Examiner* — Carib A Oquendo
(74) *Attorney, Agent, or Firm* — Birch, Stewart, Kolasch & Birch, LLP

(57) ABSTRACT

A pile upending and holding system includes a support assembly configured to be mounted on the vessel and to provide compensation for wave-induced motion of the vessel to maintain a predetermined X-Y location of the pile holder independent of said motion, and a pile holder mounted on the support assembly to be tillable about a substantially horizontal tilt axis. The pile holder includes a lower ring and an upper ring, and a pile holder frame supporting the lower ring and upper ring, the upper ring (Continued)

longitudinally spaced from the lower ring. Each of the rings include pile engaging devices distributed about the circumference thereof, each pile engaging device being adapted to engage an exterior of the pile extending through the lower and upper ring. Each of the lower ring and upper ring includes a ring base fixed to the pile holder frame and one or more movable jaws, movable between a closed position for holding and guiding the pile and an opened position for entry of the pile. The pile holder is provided, below the lower ring thereof, with a pile foot end support for engaging a longitudinal end of the pile to limit longitudinal movement thereof.

20 Claims, 22 Drawing Sheets

(51) Int. Cl.
*B63B 35/00* (2020.01)
*E02D 7/00* (2006.01)
*E02D 15/08* (2006.01)

(58) Field of Classification Search
CPC ..... E02B 2017/0091; E02B 2017/0065; E02B 2017/0039; B63B 27/10; B63B 35/00; B63B 2017/0072; F05B 2240/95; F05B 2230/6102; F05B 2230/61; B66C 1/108; B66C 13/06

See application file for complete search history.

(56) References Cited

U.S. PATENT DOCUMENTS

2017/0370068 A1* 12/2017 Mulderij ................. E02D 27/42
2020/0347960 A1* 11/2020 Roodenburg ........... E02B 17/02

FOREIGN PATENT DOCUMENTS

| WO | WO 2019/125172 A2 | 6/2019 |
| WO | WO 2019/125172 A3 | 6/2019 |
| WO | WO 2019/172752 A2 | 9/2019 |
| WO | WO 2019/172752 A3 | 9/2019 |

OTHER PUBLICATIONS

International Search Report, issued in PCT/EP2020/076537, dated Nov. 23, 2020.
Written Opinion of the International Searching Authority, issued in PCT/EP2020/076537, dated Nov. 23, 2020.

* cited by examiner

PILE UPENDING AND HOLDING SYSTEM AND METHOD

FIELD OF THE INVENTION

The invention relates to a pile upending and holding system configured to be mounted on a vessel, e.g. for installation of a pile, e.g. a monopile, adapted to support an offshore wind turbine. The invention further relates to a vessel comprising such a system and a method for using the system.

BACKGROUND OF THE INVENTION

Installation of an offshore wind turbine comprises the step of installing the foundation, often in the form of a pile, e.g. a monopile, of the offshore wind turbine. A pile is installed by driving the pile into the seabed after which the upper part of the wind turbine is arranged on top of the pile. In known methods, the pile is initially supported on a jack-up vessel in a horizontal orientation. In a typical operational sequence to install the pile, the pile is firstly upended, i.e. is pivoted in an upright position. Subsequently, the pile is lowered to the seabed at the pile installation location. Finally the pile, more in particular a lower part of the pile, is driven into the seabed.

During the processes of upending, lowering, and pile driving, commonly a gripping tool of a lifting device, for instance a crane, and a pile upending and holding system is used. The pile upending and holding system comprises an upending tool and a holding tool, mounted to or integral with the vessel, for instance mounted to an edge of the vessel. The vessel is typically a jack-up vessel, of which the legs limit motions of the vessel induced by waves and currents.

During upending, a first longitudinal end of the pile is gripped by the gripping tool of the lifting device and lifted by the lifting device while a second longitudinal end of the pile is vertically supported by the upending tool of the system. As a consequence, the first longitudinal end moves upwards relative to the second longitudinal end, so that the pile pivots upwards. The pivoting continues until the pile is in a substantially vertical orientation. To enable the pivoting of the pile, the upending tool, or at least a part thereof that is supporting the second longitudinal end of the pile, is pivotable around a substantially horizontal axis relative to the vessel.

During lowering of the pile towards the seabed, the lifting device is operated to lower the pile while still the gripping tool still retains the pile at the first longitudinal end. The holding tool of the system engages the pile during this process, to horizontally keep the pile in place while at the same time enabling vertical movement thereof relative to the tool to enable the lowering. As soon as the seabed provides sufficient vertical support for the pile, it is decoupled from the gripping tool and a driving hammering tool is installed onto the pile.

During driving of the pile into the seabed, the pile is vertically supported by the seabed and horizontally held in place by the by the holding tool. The pile is driven into the seabed until the desired depth is reached and the pile has been fixed in the seabed. Finally the pile is decoupled from the pile holder.

Publication EP 3 517 479 discloses a pile upending and holding system, comprising an upending tool and holding tool. Both tools are mounted to an edge of the vessel. A crane is used to lift the pile into the upending tool and for consequently lifting the first longitudinal end to upend the pile while supported by the upending tool. Thereafter the pile is transferred by means of the crane to the holding tool, after which the crane is operated for lowering the pile towards the seabed and for the consequent pile driving, while the pile is held by the holding tool to maintain the horizontal position of the pile.

There is a trend towards larger wind turbines, and a desire to install offshore wind turbines at locations with larger water depths than currently encountered. Both result in larger and heavier foundations—including piles, e.g. monopiles. Hence, it is expected that in the near future piles need to be installed that are larger than 100 metres, possibly 120 metres or larger. The weight of such piles may be larger than 1000 mt, possibly 1300 mt or above. The increase in size and weight makes that transporting and manipulating these piles, in particular upending these piles, is increasingly difficult.

SUMMARY OF THE INVENTION

The invention provides a system for upending and holding a pile, e.g. a pile adapted to support an offshore wind turbine, e.g. a monopile. The system is configured to be mounted on a vessel, and is e.g. suitable for installation of a pile adapted to support an offshore wind turbine. The system comprises a support assembly configured to be mounted on the vessel, e.g. on a deck of the vessel, and a pile holder. The pile holder has a center axis, and is mounted on the support assembly such as to be tiltable about a substantially horizontal tilt axis relative to the support assembly between a horizontal orientation and a vertical orientation while holding the pile longitudinally along the center axis. In the horizontal orientation of the pile holder, the center axis, and therewith, the pile, is substantially horizontal. In the vertical orientation, the center axis is substantially vertical.

The pile holder of the system comprises a lower ring, an upper ring, and a pile holder frame. The pile holder frame supports the lower ring and upper ring mutually spaced along the center axis.

Each of the lower ring and upper ring comprises a ring structure, comprising a ring base fixed to the pile holder frame and one or more movable jaws, e.g. two semi-circular jaws. The jaws are movable, e.g. pivotable around a longitudinal pivot axis, such as to move the rings between an opened position and a closed position.

In the opened position, the rings define between free ends thereof an entry opening of the pile holder for entry of the pile into the pile holder to extend through the lower and upper ring. In the closed position, the respective ring forms a closed annulus enclosing the pile extending through the rings.

The lower ring and the upper ring respectively comprise multiple lower and upper pile engaging devices. The pile engaging devices of each respective ring are connected to the ring structure of the ring, distributed about the circumference of the respective ring. Each pile engaging device is adapted to engage an exterior of a pile extending through the lower and upper ring, such as to hold the pile longitudinally along the center axis and guide the pile while it moves along the center axis. For example, each pile engaging device comprises one or more pile guiding rollers with rotation axes tangential to the circumference of the engaged exterior of the pile. For example, the rollers are coated with polyurethane. It is envisaged that the pile engaging devices define an inner contour of the rings, which matches the exterior of the pile in the closed position.

The pile holder is provided, below the lower ring thereof, with a pile foot end support that is secured to the pile holder frame and that is configured to engage with a longitudinal end portion of a pile in order to limit longitudinal movement of the pile, at least during upending of the pile.

The vessel has an X-direction running horizontally in a plane along the length of the vessel, and a Y-direction running horizontally in a transverse plane of the vessel.

The support assembly is configured to provide compensation for motion, e.g. wave-induced motion, of the vessel to maintain a predetermined X-Y location of the pile holder, and therewith the pile held thereby, independent of the motion, e.g. wave-induced motion, of the vessel. For example, the compensation functionality also compensates for inaccuracies of a dynamic position system, when present, of the vessel on which the system is mounted.

Throughout this disclosure, the longitudinal direction of the pile holder is in the direction of the center axis and thus of the pile held by the pile holder. Radial directions extend in a radial plane, perpendicular to the center axis. X-Y locations extend within a horizontal X/Y plane, which coincides with a radial plane of the pile holder when the center axis is vertical. Therein a forward direction along the X-axis extends perpendicular to the tilt axis, from the hull of the vessel to which the system is to be mounted, through the support frame and the center axis of the pile holder towards the sea, and a backward direction extends perpendicular to the tilt axis from the sea through the center axis of the pile holder and the support frame towards the hull of the vessel. Lateral directions extend parallel to the tilt axis.

Preferably, the tilt axis extends in the Y-direction.

Compared to prior art systems, including the system disclosed in EP 3 517 479, the inventive system avoids the provision of separate tools for the upending stage and for the pile gripping function during installation of the upended pile into the seabed. In said known system an intermediate stage exists wherein the pile, which is commonly of vast dimensions and mass, has to be transferred from being retained by the upending tool to being retained by the independent gripping tool. In the inventive system such an undesirable intermediate stage is avoided. This also advantageously reduces the complexity of operations to be performed by the crane in the installation procedure of a pile. Further, the elimination of the intermediate transfer stage reduces the total amount of time needed for the procedure.

During upending, the lower and upper rings as well as the pile foot end support allow for a perfect circular trajectory of a crane hook of a crane used to lift the upper end of the pile.

Prior to lowering of the upended pile, the pile may be subject to external forces such as the wind. It moves along with the vessel, which vessel is in turn subject to external forces induced by the motions of the sea, e.g. waves and currents. The movability of the pile relative to the vessel due to the lifting device generally only vertically supporting the pile, the vessel being asymmetrically loaded by the weight of the pile, and the center of gravity of the pile being raised to quite a distance above the pile holder, may cause the pile to move relative to the vessel in reaction to these external forces. In particular, the pile may vertically incline, e.g. forwards or backwards around the tilt axis while being held vertically inside the pile holder. Such tilting is highly unfavourable in particular during this stage of the process, as then the center of gravity of the pile is at its highest above the pile holder. Tilting of an upended pile while being held prior to lowering, entails the risk for the pile to become unstable and tip overboard. The lifting device, generally a crane, is generally unable to pull the first longitudinal end of the pile to counteract tilting of the pile.

When lowering the pile, as soon as the pile touches the seawater, the waves, and possibly current, start to exert forces on the pile which could cause it to start swinging like a pendulum, tilting it around horizontal axes relative to the vessel. The severity of this swinging depends on sea conditions at that time and natural period of the pile. Furthermore, in the last phase of the lowering, a shift in landing position of the pile on the seabed may tilt the pile.

In prior art systems, including EP 3 517 479, the pile is held at a single circumference prior and during lowering, e.g. by a single ring, after being transferred from the upending tool to the holding tool. A tilting is counteracted by a movement of the ring relative to the vessel, for example by X-Y motion compensation.

The provision of the pile holder with an additional ring engaging the exterior of an upended pile prior to and during lowering enables the exertion of opposite radial forces on the exterior of the pile at two longitudinally spaced circumferences of the pile, namely at the locations at which the pile engaging devices of both rings engage the exterior of the pile. This enables the pile holder to exert a force moment on the pile when the pile is vertically inclined. Hence the holder can be used push against the pile to correct a vertical inclination thereof.

The inventive tool being configured for both upending of the pile and holding during lowering with X-Y compensation, makes that the tool is able to provide this counteractive force moment not only during the stage of upending, but also during holding and guiding the pile, prior to and during lowering.

The provision of the openable jaws enables the pile to be introduced into the pile holder in a radial direction. Thus, in the horizontal orientation of the pile holder the pile can advantageously be introduced in a horizontal orientation into the pile holder. For example, the entry opening extends substantially horizontally in the horizontal orientation of the pile holder, so that the pile can be introduced from above into the pile holder, e.g. by a crane. Embodiments are also envisaged wherein an entry opening is defined vertically, so that the pile can be introduced laterally, to enable moving the pile in horizontal orientation in a substantially horizontal pile transfer direction through the entry opening when the pile holder is in the horizontal orientation. Such horizontal transfer may e.g. be performed by a track mounted pile transport device on the vessel, configured for moving the pile along a track in horizontal orientation in a substantially horizontal direction through the entry opening. Embodiments are also envisaged wherein the entry opening extends such as to allow for both horizontal and vertical entry, e.g. as known from NL2024948 by the applicant.

The pile holder may be embodied so that, when the pile holder is in the horizontal orientation, the ring base of the ring forms a bottom section of the annulus, for supporting the pile when received in the pile holder.

In an embodiment, the vessel is a monohull vessel, but alternatively, the vessel could be a semi-submersible. In an embodiment, the vessel is a jack-up type vessel of which legs can be lowered into the water and operated to lift the vessel at least partially out of the water so that waves have a limited or minimal effect on the vessel. The jack-up vessel can then be used in floating condition when the weather and wave conditions are good and can be used in jack-up condition when the weather and wave conditions are bad or when the jack-up condition is chosen for other reasons.

In an embodiment, the tilt axis is located longitudinally between the lower ring and the upper ring. In an embodiment, the tilt axis is located longitudinally in the middle between the lower ring and the upper ring. Thus, when the pile holder is in the vertical position thereof, the tilt axis is vertically in between, e.g. in the middle between, the lower ring and the upper ring. The effect is that the radial forces exerted by the rings of the pile holder, e.g. to tilt the pile holder or to counteract a vertical incline of the pile are divided over the two rings, e.g. equally divided.

In an embodiment, the system comprises one or more tilt actuators, that are operative between the support assembly, e.g. the support frame thereof, and the pile holder. The tilt actuators are configured to move the pile holder between the horizontal orientation and the vertical orientation thereof. During upending, the tilt actuators are operable to apply a force to the pile holder such as to tilt it forwardly, about the tilt axis, from the horizontal to the vertical orientation. Therewith, the tilt actuators may assist the lifting device in upending the pile. The tilt actuators may also be configured and operated to decelerate the upending movement, for example in the last part of the upending movement, e.g. configured and operated to dampen a forward momentum of the pile, such as to reduce the risk of the pile to overshoot and topple forward.

Furthermore, the tilt actuators may be configured and operated to apply a force to the pile holder such as to tilt it backwardly, about the tilt axis from the vertical to the horizontal orientation, for example after an installation procedure of a pile, e.g. in order to receive another pile to be consequently installed. Furthermore, the tilt actuators provide controllability of the upending movement additional to the control of the operation of the lifting device. The tilt actuators may furthermore be applied to correct tilting of an upended pile prior to and during lowering, e.g. over small vertical angles.

In an embodiment, the tilt actuators are hydraulic tilt cylinders, of which the piston or the cylinder is connected to the pile holder, and, respectively, the cylinder or the piston to the support assembly, e.g. the support frame thereof. The hydraulic tilt cylinders may be connected to the pile holder at a location above the tilt axis and/or forward thereof. Preferably, the tilt axis is between the rings, most preferably in the middle between the rings, and the tilt cylinder is connected to the pile holder above and forward from the tilt axis. Preferably, the cylinder is connected to the support frame at a location above the tilt axis. Preferably, in the horizontal orientation of the pile holder, the tilt cylinder is retracted and extends substantially horizontally.

In an embodiment, the tilt axis is, in the vertical orientation of the pile holder slightly further forward from the location at which the support assembly is mounted to the vessel than the center axis of the pile holder. The result is that a pile held within the holder with its center of gravity along the center axis, or backwards therefrom—which is however unlikely to occur in practice in particular when handling rotationally symmetric piles—, is slightly offset towards the mounting location relative to the tilt axis. In this way, when the pile holder is in the vertical position thereof, a tendency is created for the pile to tilt with its first, now upper, longitudinal end backwards around the tilt axis, towards the vessel, instead of forwards, away from the vessel. Thus the risk for the pile to topple forwards is reduced, as this involves a larger forwards inclination of the pile. In case of any instability, a backwards tilting pile is preferred above a forwards tilting pile, as this tilting movement is within the path of the pile in during upending. This makes that it is more convenient to correct and control, e.g. by actuators already present for the upending process, e.g. the tilt actuators, when present, and/or additional equipment operating between the pile holder and the vessel.

In an embodiment, the support assembly is provided, longitudinally spaced from the tilt axis, e.g. below the tilt axis, with a catching and retarding mechanism. This catching and retarding mechanism is configured to, in a range of angles of the center axis from a predetermined backward tilting angle to a vertical orientation, engage the pile holder and apply a force to the pile holder longitudinally spaced from the tilt axis, e.g. a forward force below the tilt axis, such as to decelerate a forward tilting movement of the pile holder and the pile held thereby. The effect is that in a last part of the upending movement, as soon as the pile holder reaches the predetermined backward tilting angle, the pile holder is engaged by the catching and retarding mechanism, and the tilting around the tilt axis is damped by the applied force, e.g. forward force, until the pile holder is in its vertical orientation. Thereby, the catching and retarding mechanism decelerates the upending movement such as to dampen a forward momentum of the pile, reducing the entailed risk of the pile to overshoot and topple forward. For example, the predetermined backward tilting angle is between 45 and 5 degrees from vertical. For example, the predetermined backward tilting angle is between 25 and 5 degrees, e.g. between 15 and 5 degrees.

For example, the catching and retarding mechanism comprises one or more hydraulic cylinders, which are fully extended when engaging the pile holder at the predetermined backward tilting angle and shorten as the backward tilting angle decreases. In an embodiment, the catching and retarding mechanism is releasably connectable, e.g. automatically, to the pile holder directly after engagement of the pile holder, e.g. with a forward end thereof which is a free end prior to the connection.

In an embodiment, the catching and retarding mechanism is furthermore configured to in a range of angles of the center axis from a vertical orientation to a predetermined forward tilting angle, maintain engagement with the pile holder and apply a forward force to the pile holder below the tilt axis such as to decelerate a forward tilting movement of the pile holder and the pile held thereby. Thereby, the catching and retarding mechanism counteracts a forward tilting movement of the pile, reducing the entailed risk of an upended pile to overshoot and topple forward. In another embodiment, a separate dedicated pile holder damping mechanism with this functionality may be provided for this purpose, for example wherein the catching and retarding mechanism and/or pile holder damping mechanism is furthermore configured to apply a force to the pile holder longitudinally spaced from the tilt axis such as to counteract a backward tilting movement of the pile holder and the pile held thereby.

Similar embodiments are envisaged wherein the catching and retarding mechanism and/or pile holder damping mechanism engages the pile holder above the tilt axis and applies a backward force to the pile holder.

The possibility to apply tilting forces and/or forces counteracting tilting of the pile, and therewith of the pile held thereby, e.g. by means of the tilt actuators and/or catching and retarding mechanism, is enabled by the provision of the two rings according to the invention. The rings being longitudinal spaced provides the possibility to apply a force moment to the pile holder relative to the support assembly, by providing actuators operating between the support assembly and the pile holder to apply a transverse force thereto which is longitudinally spaced from the tilt axis.

In an embodiment, the support assembly comprises one or more Y-rails extending in the Y-direction, a positioning frame movably supported on said one or more Y-rails, wherein the positioning frame is provided with one or more X-rails extending in the X-direction, and wherein a support frame is movably supported on said one or more X-rails, wherein the pile holder is tiltable supported by the support frame about the tilt axis.

In an embodiment, the lower and upper pile engaging devices are each movable relative to the respective ring structure of the lower and upper ring, respectively.

In an embodiment, the pile engaging devices are movable in at least a radial direction relative to the respective ring structure, e.g. actively radially movable by one or more respective actuators of the respective ring, e.g. independently from each other. The radial movability of the devices enables these to continuously hold and guide a pile with a longitudinally varying outer circumference during lowering. In an embodiment the devices are radially movable such as to remain in engagement with the exterior of the pile extending through the rings while a tapered section of the pile passes through the rings along the center axis. Therein the upper pile engagement devices are radially movable independently from the lower pile engagement devices such as to engage different respective pile circumferences at the respective rings. For instance, in case an upwardly tapered section of the pile passes through the rings during lowering of the pile, the devices are movable radially inwards, e.g. by the operation of the actuators, such as to follow the upward taper and remain engaged with the pile. Further, the pile engaging devices of each ring may be movable individually, independently from each other, such that local obstructions on the exterior of the pile can pass the pile holder during lowering.

The pile engaging devices may be actively radially movable by respective actuators, so that the engagement and disengagement by the devices of the exterior of the pile held by the pile holder is controllable by operation of these actuators, e.g. during a lowering stage. Each pile engaging device may have a separate associated actuator, so that the radial movements of the pile engaging devices are individually controllable, e.g. independently from each other. The actuators are for example embodied as hydraulic cylinders.

The active radial movability of the pile engaging devices e.g. allows for radial (re)positioning of the pile being held. Moreover, the active radial movability for example enable the pile holder to be adjustable to a range of pile diameters, so that it is configured to hold piles with different diameters. For example the pile engaging devices may prior to receipt of a pile be moved radially inwardly in case of a small diameter pile, and moved radially outwardly for holding a large diameter pile.

The radial movability of the pile engaging devices enables that radial motions of the pile relative to the vessel may be absorbed, and/or at least partly compensated, e.g. completely compensated, e.g. passively. In the vertical position of the pile holder, thereby the pile may be held in a stationary radial position relative to the vessel for example when the X-Y compensation of the support assembly is not turned on, for example while disengaging the pile foot end support from the pile prior to lowering. The radial motions may also be absorbed during upending. Furthermore, absorbing movements relative to the system reduces the loading of the system and the risk of damage resulting from such loading. For instance, during upending and while disengaging the pile foot end support from the lower end portion of the pile, the external forces, e.g. wind, acting on the pile may be absorbed and compensated by the radial movement of the pile engaging devices.

The radial movability also enables to incorporate a ring damping mechanism between the pile engaging devices and the ring structure.

In an embodiment, the system comprises such ring damping mechanism in one of, or in both the rings of the pile holder, e.g. configured to suppress oscillation during upending and lowering, and/or suppress undesired tilting of the upended pile. In an embodiment the ring damping system passively damps out movements of the pile in the radial plane of the ring, while draining energy from the radial movements of the pile engaging devices involved in such oscillation or tilting. Such passive ring damping mechanism e.g. comprises radially extending cylinders passively shortening and extending upon radial movements of the pile engaging devices relative to the ring structure of the respective ring. In an embodiment one ring damping mechanism is provided, e.g. in the upper ring.

In an embodiment, the pile engaging devices of at least one of the lower ring and the upper ring, e.g. only of the lower ring, are movable relative to the respective ring structure along an arc segment of the closed annulus formed by the respective ring while remaining engaged with the pile exterior, so as to allow for adaptation of the angular position of the pile engaging devices relative to the ring structure and therewith for moving the held pile over an angle around its vertically oriented longitudinal axis into a desired angular position.

In an embodiment, the pile engaging devices of one of the rings, e.g. of the upper ring, have a fixed angular position relative to the ring structure of the respective ring.

In an embodiment the pile engaging devices of at least one of the rings, e.g. those having a fixed angular position, allow movement of the held pile over an angle around its longitudinal axis into a desired angular position of the pile relative to the pile engaging devices while remaining engaged with the pile exterior, e.g. allow slipping of the pile exterior over the associated pile engaging devices in the angular movement direction.

In an embodiment the pile engaging devices of at least one of the rings, e.g. those having a fixed angular position, allow movement of the held pile over an angle around its longitudinal axis into a desired angular position of the pile relative to the pile engaging devices in the angular movement direction while being clear from the pile exterior, e.g. being movable radially outwardly to disengage the pile exterior while the pile engaging devices of the other ring remain engaged with the pile exterior, and radially inwardly to again engage the pile exterior.

In an embodiment the pile engaging devices of both rings are angularly movable as described. In an embodiment wherein the pile engaging devices of both rings are movable, and both the upper and lower pile engaging devices allow movement of the held pile over an angle around its longitudinal axis into a desired angular position of the pile relative to the pile engaging devices in the angular movement direction. This embodiment enables to firstly move the upper pile engaging devices over their respective arc segments, and consequently the lower pile engaging devices over their respective arc segments. This enables to move the pile over the total angular range of the respective arc segments together.

In an embodiment, the lower pile engaging devices are movable along the arc segment of the lower ring while remaining engaged with the pile exterior as described, and the upper pile engaging devices have a fixed angular position as described. In an embodiment, the upper pile engaging devices are radially movable by means of one or more actuators. This enables the upper pile engaging devices to move outwardly to disengage the pile exterior and inwardly to engage the pile exterior again. As a result, the upper pile engaging devices are movable to be clear from the pile exterior prior to movement of the lower pile engaging devices along the arc segment to adjust the angular position thereof, and of the held pile, so that the pile can move around its longitudinal axis unhindered. The upper pile engaging devices are movable radially inwardly, to be able to consequently engage the pile exterior again after the angular movement of the pile.

The lower pile engaging devices may be movable radially as well, such as to be able to disengage the pile exterior after adjustment of the angular position, while the upper pile engaging devices remain engaged with the pile exterior. This enables, the lower pile engaging devices to be movable back along the same arc segment to their initial angular positions while clear from the pile exterior, and consequently movable radially inwardly to engage the pile exterior again.

In effect, an adjustment process is made possible to change of the angular position of the pile relative to its longitudinal axis, while during the complete process the pile continuously remains engaged by multiple of the pile engaging devices, namely at least those of one of the rings. For example, the number of the pile engaging devices of the lower ring is equal to the number of the pile engaging devices of the upper ring, so that during the adjustment process the pile continuously remains engaged by half of the pile engaging devices.

The above may obviously also be applied similarly in a reverse embodiment wherein the upper pile engaging devices are angularly movable and the upper pile engaging devices have a fixed angular position.

In an embodiment, the pile foot end support comprises one or more pivotal arms that are movable into an operative position wherein the one or more pivotal arms extend underneath the longitudinal end portion of the pile and an opened position wherein the one or more pivotal arms are cleared from the pile end portion.

In an embodiment, the system comprises a deployable noise-mitigation screen having a storage device that is mounted on the pile holder below the lower ring, e.g. between the lower ring and the pile foot end support. For example, the pile holder is provided with a storage cage for a screen.

The invention furthermore relates to a method for upending and installation of a pile, wherein use is made of the inventive system herein described. The method comprises, with the vessel in floating condition:
   a. transporting a pile in a horizontal orientation to an offshore installation site;
   b. opening the one or more jaws of the lower and upper rings,
   c. with the pile holder in the horizontal orientation, placing the pile in horizontal orientation with a first longitudinal end portion thereof on the bases of the lower and upper rings,
   d. closing the one or more jaws of both rings,
   e. upending the pile into vertical orientation by means of lifting a second longitudinal end portion of the pile, so that the pile held at the first longitudinal end portion thereof by the pile holder tilts about the horizontal tilt axis of the pile holder, wherein the pile foot end support limits longitudinal movement of the pile, during the upending of the pile,
   f. disengaging the pile foot end support from the first longitudinal end portion of the pile;
   g. lowering the pile into the water while being held and guided by pile engaging devices of the pile holder.

The support assembly provides compensation for wave-induced motion of the vessel to maintain a predetermined X-Y location of the pile holder independent of the wave-induced motion of the vessel at least in step g.

It will be appreciated that during step f, thus the disengaging of the pile foot end support, the pile engaging devices of the pile holder may be used, and preferably are used, to engage the pile and keep the pile stationary in the horizontal plane, compensating for vessel motion and absorbing external forces, e.g. wind, acting on the pile.

A lifting device, e.g. a crane, on the vessel may be used to perform step c, even as the lifting of lifting the second longitudinal end portion of the pile in step e and the lowering of step g, as is known in the art.

As preferred, the method may include a step of lifting the pile off the pile foot end support while moving the pivotal arms from the operative position to the opening position. In an embodiment wherein the system is embodied as herein described to apply forces counteracting tilting of the pile, the method comprises counteracting of a tilting of the pile during any of steps e, f and g, by the pile engaging devices of the respective rings applying opposite radial forces to the pile create a force moment around the tilt axis in the opposite direction of the tilting of the pile. For example the method may comprise applying a force moment to the pile holder as a whole, by means of one or more actuators, e.g. a forward or backward pushing or pulling force at a location on the pile holder offset from the tilt axis, so that this force moment is transferred to the pile via the rings engaging the pile. In addition or alternatively, the method may comprise pushing the pile forward relative to the ring structure of one of the rings by the pile engaging devices thereof, and pushing the pile backward relative to the ring structure of the other one of the rings by the pile engaging devices thereof, by one or more actuators operating between the respective ring structure and pile engaging devices.

In an embodiment of the method wherein the system comprises the catching and retarding mechanism, the method comprises, in a last part of step e, engaging the pile holder by the catching and retarding mechanism and applying thereby a force to the pile holder longitudinally spaced from the tilt axis such as to decelerate a forward tilting movement of the pile holder and the pile held thereby such that the tilting around the tilt axis is dampened by the applied force until the pile holder is in its vertical orientation. In effect, the upending movement is decelerated such as to dampen a forward momentum of the pile, reducing the entailed risk of the pile to overshoot and topple forward. In an embodiment, the method comprises engaging the pile holder by the catching and retarding mechanism as soon as the pile holder reaches a predetermined backward tilting angle of for example between 45 and 5 degrees from vertical, e.g. between 25 and 5 degrees, e.g. between 15 and 5 degrees.

In an embodiment wherein the system comprises the catching and retarding mechanism and/or pile holder damping mechanism, the method comprises in step f and/or g, applying thereby a forward force to the pile holder below the tilt axis and/or a backward force above the tilt axis such as to correct a forward tilting movement of the pile holder and the pile held thereby. In an embodiment wherein the system comprises the tilt actuator and/or the pile holder damping mechanism, the method comprises in step f and/or g, applying thereby a backward force to the pile holder below the tilt axis and/or a forward force above the tilt axis such as to correct a backward tilting movement of the pile holder and the pile held thereby.

In an embodiment wherein one or both of the rings comprise a ring damping mechanism as herein described, steps e, f and/or g comprise suppressing oscillation of the pile and/or undesired tilting of the upended pile by the ring damping mechanism. In an embodiment, the ring damping system performs such suppression and/or correction by passively damping out movements of the pile in the radial plane of the ring, while draining energy from the radial movements of the pile engaging device(s) relative to the respective ring structure(s) involved with the oscillations and/or tilting.

In an embodiment wherein the pile engaging devices are movable in at least a radial direction relative to the respective ring structure, step g comprises radial movement of the upper pile engagement devices independently from the lower pile engagement devices such as to follow longitudinal variations in the circumference of the pile, e.g. a taper of the pile. In an embodiment step g comprises individual radial movement of one or more of the pile engaging devices independent of the other devices such as to follow tangential variations, e.g. local obstructions on the exterior of the pile.

In an embodiment of the method wherein the system is embodied as herein described to provide angular movability of the pile engaging devices, once the pile has been upended and the pile foot end support has been disengaged from the pile, the method comprises a process of adjusting the angular position of the pile relative to its longitudinal axis. Such process is known in the art for a pile holder with a single ring, and comprises moving a part of, or all of the pile engaging devices of the ring angularly to move therewith the held pile over an angle around its vertically oriented longitudinal axis into a desired angular position.

The pile holder comprising two rings according to the invention, wherein both rings comprise respective pile engaging devices, enables that the pile engaging devices of one of the rings, e.g. the lower ring, are moved angularly while the pile engaging devices of the other one of the rings, e.g. the upper ring, remain in place.

In an embodiment of the method according to the invention, the method comprises between steps e and f, and/or after step f and/or during step g a process of adjusting the angular position of the pile relative to its longitudinal axis. In an embodiment, the angular adjustment process comprises moving the pile engaging devices of one of the rings, e.g. the lower ring, angularly while being held into engagement with the pile exterior, to move therewith the held pile over an angle around its vertically oriented longitudinal axis into a desired angular position, while maintaining the angular position of the pile engaging devices of the other one of the rings, e.g. the upper ring.

In an embodiment, during the angular movement of the pile engaging devices of the one of the rings, e.g. the lower ring, the pile exterior slips over the pile engaging devices of the other one of the rings, e.g. the upper ring, in the direction of the angular movement.

In another embodiment, during the angular movement of the pile engaging devices of the one of the rings, e.g. the lower ring, the pile exterior is clear from the pile engaging devices of the other one of the rings, e.g. the upper ring. In this embodiment, the angular adjustment process comprises, prior to the angular movement, clearing the upper pile engaging devices of the upper ring from the pile exterior, e.g. by moving these radially outwards relative to the ring structure such as to disengage the exterior of the pile. The process may further comprise, thereafter, engaging the exterior of the pile by the pile engaging devices of the other one of the rings, e.g. the upper ring, again.

After the re-engagement of the pile engaging devices of the other one of the rings, e.g. the upper ring, with the pile exterior, the pile engaging devices of the one of the rings, e.g. the lower ring, may be moved angularly in the opposite direction back to their initial positions prior to the angular movement. During this movement the pile engaging devices of the other one of the rings, e.g. the upper ring, are held into engagement with the pile exterior. In an embodiment the pile engaging devices of the one of the rings, e.g. the upper ring, slip over the pile exterior during their movement back to the initial positions. In another embodiment the pile exterior is clear from the pile engaging devices of the one of the rings, e.g. the upper ring. In this embodiment, the angular adjustment process comprises, prior to the moving back, clearing the pile engaging devices of the one of the rings from the pile exterior, e.g. by moving these radially outwards relative to the ring structure such as to disengage the exterior of the pile, and may further comprise, thereafter, engaging the exterior of the pile by the pile engaging devices of the one of the rings again.

Compared to the prior art, it is thus made possible that pile engaging devices along longitudinally spaced circumferences may simultaneously respectively be held in place and moved angularly. This may increase the efficiency of angular adjustment processes and increase the angular range of motion of the pile engaging devices, as devices remaining in place are not in the same circumference as the moving devices and cannot form an obstruction to the movement of the latter. During the complete process the pile continuously remains engaged by multiple of the pile engaging devices, namely those of at least one of the rings.

It is noted that, if desired, a final angular adjustment process of the pile may be done shortly before the pile reaches the seabed. As this involves generally a small angular setting, it may be preferred to perform this process, if desired, with all pile engaging devices remaining in engagement with the pile exterior, the pile engaging devices of the other one of the rings, e.g. the upper ring, allowing for some angular motion of the pile, e.g. the pile slipping relative to them whilst being driven angularly by the devices of the lower ring.

Embodiments are also envisaged wherein the pile engaging devices of both rings are angularly moved. For example, the devices of each respective ring are angularly moved consequently, while the devices of the other ring remain in place, e.g. to achieve a relatively large angular movement of the pile. Or, for example, the devices of both rings are moved angularly synchronously, e.g. to obtain more grip on the pile exterior during the movement, or e.g. in order to enable quick correction any tilting of the pile during the angular movement by radial counteracting movements of the pile engaging devices on the pile. It is noted that also in an embodiment wherein the pile exterior slips over the engaging devices remaining in place while angularly moving, all pile engaging devices are continuously in engagement with the pile such as to allow such quick correction of any tilting.

The invention further relates to a system for upending and holding a pile, configured to be mounted on a vessel. The system comprises a support assembly configured to be mounted on the vessel, e.g. on a deck of the vessel, and a pile holder. The pile holder has a center axis, and is mounted on the support assembly such as to be tiltable about a substantially horizontal tilt axis relative to the support assembly between a horizontal orientation and a vertical orientation while holding the pile longitudinally along the center axis. In the horizontal orientation of the pile holder, the center axis, and therewith, the pile, is substantially horizontal. In the vertical orientation, the center axis is substantially vertical.

The support assembly is configured to provide compensation for wave-induced motion of the vessel to maintain a predetermined X-Y location of the pile holder, and therewith the pile held thereby, independent of the wave-induced motion of the vessel.

The pile holder of the system comprises a lower ring, an upper ring, and a pile holder frame. The pile holder frame supports the lower ring and upper ring mutually spaced along the center axis.

The lower ring and the upper ring respectively comprise multiple lower and upper pile engaging devices. The pile engaging devices of each respective ring are connected to the ring structure of the ring, distributed about the circumference of the respective ring. Each pile engaging device is adapted to engage an exterior of a pile extending through the lower and upper ring, such as to hold the pile longitudinally along the center axis and guide the pile while it moves along the center axis.

The pile holder is provided, below the lower ring thereof, with a pile foot end support that is secured to the pile holder frame and that is configured to engage with a longitudinal end portion of a pile in order to limit longitudinal movement of the pile, at least during upending of the pile.

Preferably, each of the lower ring and upper ring comprises a ring structure, comprising a ring base fixed to the pile holder frame and one or more movable jaws, e.g. two semi-circular jaws. The jaws are movable such as to move the rings between an opened position and a closed position. In the opened position, the rings between free ends thereof define an entry opening of the pile holder for entry of the pile into the pile holder to extend through the lower and upper ring. In the closed position, the respective ring forms a closed annulus enclosing the pile extending through the rings.

In a second aspect thereof, the invention relates to a system for holding a pile which is configured to be mounted on a vessel. The system comprises a support assembly configured to be mounted on the vessel, e.g. on a deck of the vessel, and a pile holder.

The support assembly is configured to provide compensation for wave-induced motion of the vessel to maintain a predetermined X-Y location of the pile holder independent of the wave-induced motion of the vessel.

The pile holder has a center axis and is mounted on the support assembly such as to be tiltable about a substantially horizontal tilt axis relative to the support assembly, e.g. between a horizontal orientation, in which the center axis is substantially horizontal, and a vertical orientation, in which the center axis is substantially vertical, e.g. while holding the pile longitudinally along the center axis during upending thereof.

The pile holder comprises at least one ring adapted to enclose the pile extending therethrough with a longitudinal axis of the pile extending along the center axis of the pile holder, and a pile holder frame supporting the at least one ring, e.g. supporting a lower ring and upper ring mutually spaced along the center axis.

The at least one ring comprises a ring structure and multiple pile engaging devices connected to the ring structure of the ring, distributed about the circumference of the ring. Each pile engaging device is adapted to engage an exterior of the pile extending through the ring such as to hold the pile longitudinally along the center axis and guide the pile while it moves along the center axis, e.g. each pile engaging device comprising one or more pile guiding rollers.

The substantially horizontal tilt axis of the system is located—with the pile extending substantially vertically through the at least one ring—further forward, e.g. slightly further forward, from the location at which the support assembly is mounted to the vessel than the center axis of the pile holder. The result is a tendency of the pile to tilt with its upper, longitudinal end backwards around the tilt axis, towards the vessel, instead of forwards, away from the vessel. Thereby the risk for the pile to topple forwards is reduced, as explained herein before. A tilting of the pile may e.g. be counteracted by one or more tilt actuators of the support assembly acting on the tiltable pile holder, radial movements of the pile engaging devices, and/or by movements of the pile holder relative to the vessel by the support frame, e.g. in the X-Y plane.

Preferably, each ring of the pile holder comprises a ring base fixed to the pile holder frame and one or more movable jaws, e.g. two semi-circular jaws, which are movable such as to move the rings between an opened position and a closed position. In the opened position, the rings define an entry opening of the pile holder for entry of the pile into the pile holder to extend through the lower and upper ring. In the closed position, the ring forms a closed annulus enclosing the pile extending through the rings.

Preferably, the pile holder is provided with a pile foot end support that is secured to the pile holder frame and/or the ring, e.g. the lowering, and that is configured to engage with a longitudinal end portion of a pile in order to limit longitudinal movement of the pile, at least during upending of the pile.

Preferably, the system is a system for holding and upending a pile as described in relation to the first aspect. It is noted that in as far possible, one or more features and embodiments described in relation to the first aspect may be applied to the system according to the second aspect for providing similar effects and advantages.

The second aspect of the invention also relates to a vessel comprising the system according to the second aspect, and a method wherein use is made of such system or vessel, e.g. a method according to the first aspect of the invention.

In a third aspect thereof, the invention relates to a system for holding a pile which is configured to be mounted on a vessel. The system comprises a support assembly configured to be mounted on the vessel, e.g. on a deck of the vessel, and a pile holder.

The support assembly is configured to provide compensation for motion, e.g. wave-induced motion, of the vessel to maintain a predetermined X-Y location of the pile holder independent of the motion of the vessel.

The pile holder has a center axis and is mounted on the support assembly such as to be tiltable about a substantially horizontal tilt axis relative to the support assembly, e.g. between a horizontal orientation, in which the center axis is substantially horizontal, and a vertical orientation, in which the center axis is substantially vertical, while holding the pile longitudinally along the center axis.

The pile holder comprises an upper ring and a lower ring mutually spaced along the center axis, adapted to enclose the pile extending therethrough with a longitudinal axis of the pile extending along the center axis of the pile holder, and a pile holder frame supporting the lower and upper ring.

Each ring comprises a ring structure and multiple pile engaging devices connected to the ring structure of the ring, distributed about the circumference of the ring. Each pile engaging device is adapted to engage an exterior of the pile extending through the ring such as to hold the pile longitudinally along the center axis and guide the pile while it moves along the center axis, e.g. each pile engaging device comprising one or more pile guiding rollers.

The substantially horizontal tilt axis of the system extends, with the pile extending substantially vertically through the at least one ring, longitudinally in between the lower ring and the upper ring, e.g. in the middle there between. Thus, when the pile holder is in the vertical position thereof, the tilt axis is vertically in between, e.g. in the middle between, the lower ring and the upper ring. As described herein before, the effect is that radial forces exerted by the rings of the pile holder, e.g. as transferred from one or more actuators of the support assembly as described before, e.g. to tilt the pile holder and/or counteract a vertical incline of the pile, are divided over the two rings, e.g. equally divided.

Each ring of the pile holder, preferably, comprises a ring base fixed to the pile holder frame and one or more movable jaws, e.g. two semi-circular jaws, which are movable such as to move the jaws between an opened position and a closed position. In the opened position, the rings define an entry opening of the pile holder for entry of the pile into the pile holder to extend through the lower and upper ring. In the closed position, the ring forms a closed annulus enclosing the pile extending through the rings.

Preferably, the pile holder is provided with a pile foot end support that is secured to the pile holder frame and that is configured to engage with a longitudinal end portion of a pile in order to limit longitudinal movement of the pile, at least during upending of the pile.

Preferably, the system is a system for holding and upending a pile as described in relation to the first aspect. It is noted that in as far technically possible, features and embodiments described in relation to the first and/or second aspect may be applied to the system according to the third aspect for providing similar effects and advantages.

The third aspect of the invention also relates to a vessel comprising the system according to the third aspect, and a method wherein use is made of such system or vessel, e.g. a method according to the first aspect of the invention.

In a fourth aspect thereof, the invention relates to a system for holding a pile which is configured to be mounted on a vessel. The system comprises a support assembly configured to be mounted on the vessel, e.g. on a deck of the vessel, and a pile holder.

The support assembly is configured to provide compensation for motion, e.g. wave-induced motion, of the vessel to maintain a predetermined X-Y location of the pile holder independent of the motion of the vessel.

The pile holder has a center axis and is mounted on the support assembly such as to be tiltable about a substantially horizontal tilt axis relative to the support assembly, e.g. between a horizontal orientation, in which the center axis is substantially horizontal, and a vertical orientation, in which the center axis is substantially vertical, e.g. while holding the pile longitudinally along the center axis.

The pile holder comprises a lower ring and an upper ring mutually spaced along the center axis, adapted to enclose the pile extending therethrough with a longitudinal axis of the pile extending along the center axis of the pile holder, and a pile holder frame supporting the lower and upper ring.

Each ring comprises a ring structure and multiple pile engaging devices connected to the ring structure of the respective ring, distributed about the circumference of the ring. The upper ring comprises multiple upper pile engaging devices, and the lower ring comprises multiple pile engaging devices. Each pile engaging device is adapted to engage an exterior of the pile extending through the ring such as to hold the pile longitudinally along the center axis and guide the pile while it moves along the center axis, e.g. each pile engaging device comprising one or more pile guiding rollers.

The pile engaging devices of at least one of the rings are radially movable with respect to the ring structure of the respective ring while engaging the pile exterior, such as to radially move the engaged pile within the ring. In an embodiment, the pile engaging devices of both of the rings are radially movable, preferably the lower pile engaging devices being independently movable from the upper pile engaging devices. As described herein before, the radial movability may be such as to allow varying circumferences to be engaged, to horizontally position the pile, to dampen oscillations while draining energy therefrom, and/or to counteract undesired tilting of the pile.

The rings of the pile holder, preferably, each comprise a ring base fixed to the pile holder frame and one or more movable jaws, e.g. two semi-circular jaws, which are movable between an opened position and a closed position. In the opened position, the jaws between free ends thereof define an entry opening of the pile holder for entry of the pile into the pile holder to extend through the lower and upper ring. In the closed position, the ring forms a closed annulus enclosing the pile extending through the rings.

Preferably, the pile holder is provided with a pile foot end support that is secured to the pile holder frame and that is configured to engage with a longitudinal end portion of a pile in order to limit longitudinal movement of the pile, at least during upending of the pile.

Preferably, the system is a system for holding and upending a pile as described in relation to the first and/or second aspect. It is noted that in as far as technically possible, one or more features and embodiments described in relation to the first or second aspect may be applied to the system according to the fourth aspect for providing similar effects and advantages.

The fourth aspect of the invention also relates to a vessel comprising the system according to the fourth aspect, and a method wherein use is made of such system or vessel—for instance an embodiment of the method described in relation to the first aspect, e.g. the method comprising radial movements of the pile engaging devices during or after steps e, f and/or g of such method.

According to a fifth aspect thereof, the invention relates to a system for holding a pile which is configured to be mounted on a vessel. The system comprises a support assembly configured to be mounted on the vessel, e.g. on a deck of the vessel, and a pile holder.

The support assembly is configured to provide compensation for motion, e.g. wave-induced motion, of the vessel to maintain a predetermined X-Y location of the pile holder independent of the motion of the vessel.

The pile holder has a center axis and is mounted on the support assembly such as to be tiltable about a substantially horizontal tilt axis relative to the support assembly, e.g. between a horizontal orientation, in which the center axis is substantially horizontal, and a vertical orientation, in which the center axis is substantially vertical, e.g. while holding the pile longitudinally along the center axis during upending.

The pile holder comprises a lower ring and an upper ring mutually spaced along the center axis, and each adapted to enclose the pile extending therethrough with a longitudinal axis of the pile extending along the center axis of the pile holder, and a pile holder frame supporting the lower and upper rings.

Each ring comprises a ring structure and multiple pile engaging devices connected to the ring structure of the respective ring, distributed about the circumference of the ring. The upper ring comprises multiple upper pile engaging devices, and the lower ring comprises multiple pile engaging devices. Each pile engaging device is adapted to engage an exterior of the pile extending through the ring such as to hold the pile longitudinally along the center axis and guide the pile while it moves along the center axis, e.g. each pile engaging device comprising one or more pile guiding rollers.

The pile engaging devices of at least one of the lower ring and the upper ring, e.g. only the lower pile engaging devices, are movable relative to the respective ring structure along an arc segment of the closed annulus formed by the respective ring, e.g. while remaining engaged with the pile exterior, so as to allow for adaptation of the angular position of the pile engaging devices relative to the ring structure and, possibly, for moving the held pile over an angle around its vertically oriented longitudinal axis into a desired angular position.

In an embodiment, the pile engaging devices of one of the rings, e.g. of the upper ring, have a fixed angular position relative to the ring structure of the respective ring.

In an embodiment, the pile engaging devices of at least one of the rings, e.g. those having a fixed angular position, allow movement of the held pile over an angle around its longitudinal axis into a desired angular position of the pile relative to the pile engaging devices while remaining engaged with the pile exterior, e.g. allow slipping of the pile exterior over the associated pile engaging devices in the angular movement direction.

In an embodiment, the pile engaging devices of at least one of the rings, e.g. those having a fixed angular position, allow movement of the held pile over an angle around its longitudinal axis into a desired angular position of the pile relative to the pile engaging devices in the angular movement direction while being clear from the pile exterior, e.g. being movable radially outwardly to disengage the pile exterior while the pile engaging devices of the other ring remain engaged with the pile exterior, and radially inwardly to again engage the pile exterior.

In an embodiment, the pile engaging devices of both rings are angularly movable as described. In an embodiment wherein the pile engaging devices of both rings are movable, and both the upper and lower pile engaging devices allow movement of the held pile over an angle around its longitudinal axis into a desired angular position of the pile relative to the pile engaging devices in the angular movement direction. This embodiment enables to firstly move the upper pile engaging devices over their respective arc segments, and consequently the lower pile engaging devices over their respective arc segments. This enables to move the pile over the total angular range of the respective arc segments together.

In an embodiment, the lower pile engaging devices are movable along the arc segment of the lower ring while remaining engaged with the pile exterior as described, and the upper pile engaging devices have a fixed angular position as described. In an embodiment, the upper pile engaging devices are radially movable by means of one or more actuators. This enables the upper pile engaging devices to move outwardly to disengage the pile exterior and inwardly to engage the pile exterior again. As a result, the upper pile engaging devices are movable to be clear from the pile exterior prior to movement of the lower pile engaging devices along the arc segment to adjust the angular position thereof, and of the held pile, so that the pile can move around its longitudinal axis unhindered. The upper pile engaging devices are movable radially inwardly, to be able to consequently engage the pile exterior again after the angular movement of the pile.

The lower pile engaging devices may be movable radially as well, such as to be able to disengage the pile exterior after adjustment of the angular position, while the upper pile engaging devices remain engaged with the pile exterior. This enables, the lower pile engaging devices to be movable back along the same arc segment to their initial angular positions while clear from the pile exterior, and consequently movable radially inwardly to engage the pile exterior again.

In effect, an adjustment process is made possible to change of the angular position of the pile relative to its longitudinal axis, while during the complete process the pile continuously remains engaged by multiple of the pile engaging devices, namely at least those of one of the rings. For example, the number of the pile engaging devices of the lower ring is equal to the number of the pile engaging devices of the upper ring, so that during the adjustment process the pile continuously remains engaged by half of the pile engaging devices. The above may also be applied similarly in a reverse embodiment wherein the upper pile engaging devices are angularly movable and the upper pile engaging devices have a fixed angular position.

The at least one ring of the pile holder, preferably, comprises a ring base fixed to the pile holder frame and one or more movable jaws, e.g. two semi-circular jaws, which are movable between an opened position and a closed position. In the opened position, the jaws between free ends thereof define an entry opening of the pile holder for entry of the pile into the pile holder to extend through the lower and upper ring. In the closed position, the ring forms a closed annulus enclosing the pile extending through the rings.

Preferably, the pile holder is provided with a pile foot end support that is secured to the pile holder frame and that is configured to engage with a longitudinal end portion of a pile in order to limit longitudinal movement of the pile, at least during upending of the pile.

Preferably, the system is a system for holding and upending a pile as described in relation to the first aspect. It is noted that in as far as technically possible, one or more features and embodiments described in relation to the first aspect may be applied to the system according to the fourth aspect for providing similar effects and advantages.

The fifth aspect of the invention also relates to a vessel comprising the system according to the fifth aspect, and a method wherein use is made of such system or vessel—for instance an embodiment of the method described in relation to the first aspect, e.g. the method comprising angular movement of the pile during or after step f and/or g of such method.

A sixth aspect of the invention relates to the situation that a pile, e.g. monopile to be installed as foundation of an offshore wind turbine, which is held in vertical orientation in a pile holder that is mounted on a vessel exhibits an undesirable motion during the installation process, e.g. due to the lower pile end sliding away sideways, e.g. during the landing or during the pile driving phase, e.g. due soil related effects. In the extreme, due to the vast dimensions and mass of a pile, e.g. in a monopile for a wind turbine, this situation may lead to forces that cannot be absorbed by the pile holder and/or the vessel.

The sixth aspect of the invention provides for a method for installation of a pile in the seabed, e.g. a monopile to be installed as foundation of an offshore wind turbine, wherein use is made of a pile holding system mounted on a vessel, comprising:
- a support assembly mounted on the vessel, e.g. on a deck of the vessel,
- a pile holder mounted on the support assembly, in which the pile holder is configured to hold a pile in a substantially vertical orientation,
- wherein the pile holder comprises:
- at least one ring,
- a pile holder frame supporting the at least one ring,
- wherein the ring comprises multiple pile engaging devices that are distributed about the circumference of the ring, each pile engaging device being adapted to be engage an exterior of a pile extending through the ring, e.g. each pile engaging device comprises one or more pile guiding rollers, e.g. each independently movable radially by one or more actuators,
- wherein the ring comprises a ring base that is fixed to the pile holder frame and one or more movable jaws, e.g. two semi-circular jaws, each jaw being movable between a closed position, wherein the respective ring forms a closed annulus, and an opened position,
- wherein the method comprises:
  - detecting an anomalous situation, e.g. on the basis of a measurement of the pile orientation, e.g. the pile inclination, e.g. a continuous and automated measurement of the pile orientation, and/or on the basis of a measurement of one or more forces acting on the pile holder or parts thereof, e.g. on the pile engaging devices, e.g. a continuous and automated measurement of said one or more forces, e.g. said anomalous situation being the the pile foot end sliding away, e.g. upon landing the pile onto the seabed, placing a pile driver on the pile that has been landed on the seabed, and/or during driving the pile into the seabed,
  - causing the support assembly to move the pile holder and the pile held thereby away from the vessel,
  - opening the one or more movable jaws so as to release the pile holder from the pile, e.g. the pile falling away from the vessel into the sea,
  - optionally retracting the opened pile holder towards the vessel.

Preferably, the above steps are performed automatically.

The step of opening the jaw(s) can be done, as preferred, in overlap with moving the pile holder away from the vessel.

Preferably, the step of moving the pile holder away from the vessel is done fast so as to cause the pile to have sufficient speed that it keeps falling away from the vessel.

It will be appreciated that the pile holder of the sixth aspect of the invention may have just one ring, or may have another configuration, e.g. may have two rings as disclosed herein.

Whilst this approach may result in the pile coming to lie on the seabed, and thus potentially the need for later retrieval of the pile, the approach avoids that an undesirable situation becomes even more problematic, e.g. taking into account that a monopile may weigh more than 1000 tonnes.

Preferably, the system comprises a computerized controller having stored therein an emergency routine that upon start of the routine, e.g. by an emergency button and/or by automated evaluation of one or more parameters related to the pile installation process. For example, the angle of the pile is measured as a parameter, and/or the penetration depth of the pile, and/or one or more forces on the pile holder, e.g. on the pile engaging devices and/or other parts of the pile holder, etc.

The sixth aspect of the invention also relates to a pile holding system for installation of a pile in the seabed, wherein the pile holding system is configured for mounting on a vessel or is mounted on a vessel, comprising:
- a support assembly configured to be mounted or mounted on the vessel, e.g. on a deck of the vessel,
- a pile holder mounted on the support assembly, in which the pile holder is able to hold a pile in a substantially vertical orientation,
- wherein the pile holder comprises:
- at least one ring,
- a pile holder frame supporting the ring,
- wherein the ring comprises multiple pile engaging devices distributed about the circumference of the ring, each pile engaging device being adapted to be engage an exterior of a pile extending through the ring, e.g. each pile engaging device comprises one or more pile guiding rollers,
- wherein the ring comprises a ring base fixed to the pile holder frame and one or more movable jaws, e.g. two semi-circular jaws, each jaw being movable between a closed position, wherein the respective ring forms a closed annulus, and an opened position, wherein the system is configured for, upon detection of an anomalous situation, e.g. the pile foot end sliding away:
  - causing the support assembly to move the pile holder and the pile held thereby away from the vessel,
  - opening the one or more movable jaws so as to release the pile holder from the pile, e.g. the pile falling away from the vessel into the sea,
  - optionally retracting the opened pile holder towards the vessel.

For example, as preferred, the system comprises a computerized controller configured, e.g. programmed, to perform an emergency routine that upon start of the routine, e.g. by operation of an emergency button and/or by automated evaluation of one or more parameters related to the pile installation process:
- causes the support assembly to move the pile holder and the pile held thereby away from the vessel,
- opens the one or more movable jaws so as to release the pile holder from the pile, e.g. the pile falling away from the vessel into the sea,
- optionally retracts the opened pile holder towards the vessel.

For example, the angle of the pile is measured as a parameter, and/or the penetration depth of the pile, and/or one or more forces on the pile holder, etc.

The sixth aspect of the invention may be implemented in combination with any one or more of the other aspects, e.g. the system according to the first or second aspect. Other implementations are also envisaged.

The invention also relates to a vessel comprising the system according to one or more aspects of the invention, and a method for installation of a pile on the seabed wherein use is made of such system or vessel equipped with such a system.

The invention will now be described with reference to the drawings.

DETAILED DESCRIPTION OF EMBODIMENTS

Figure 1A:
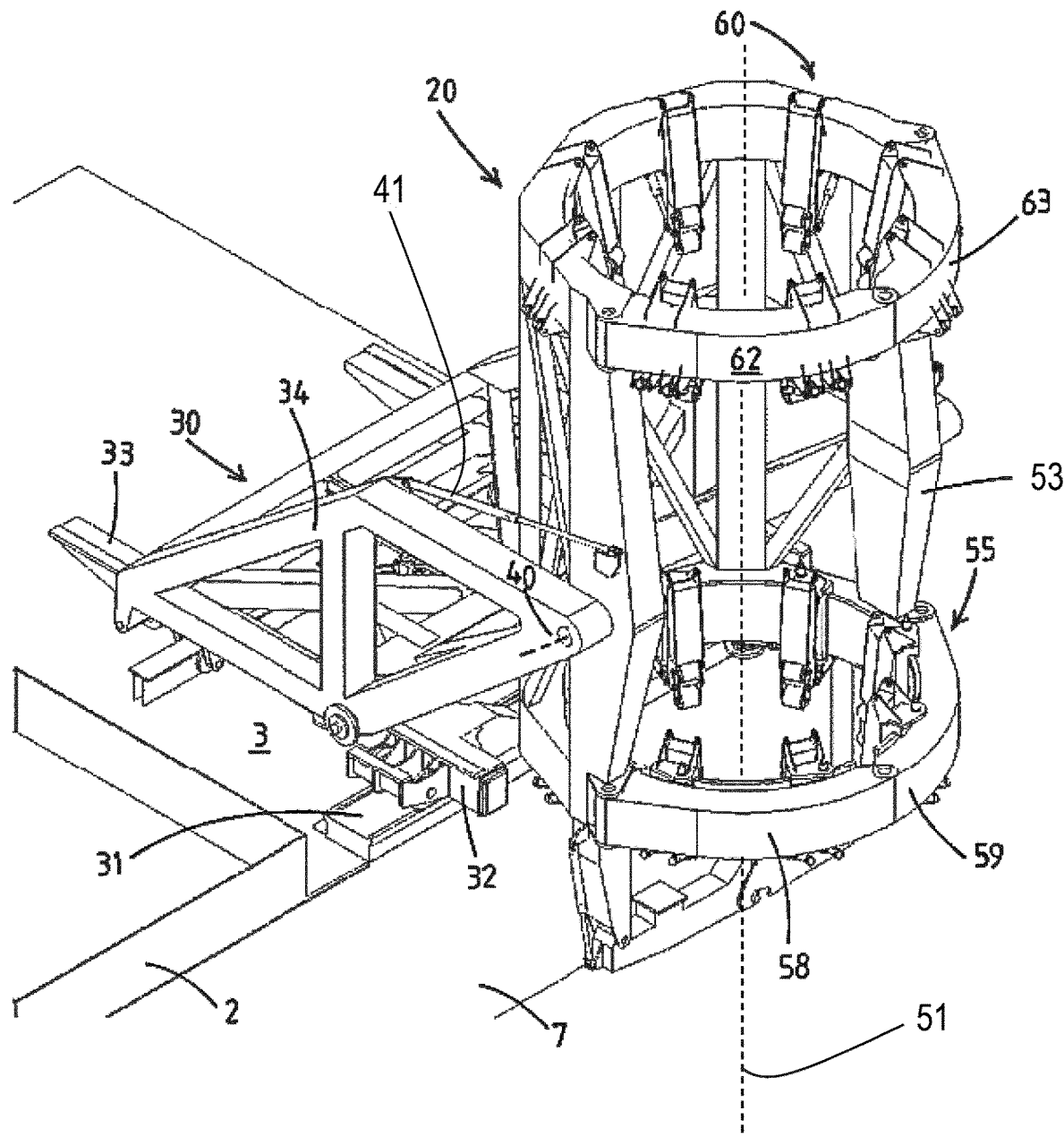
FIG. 1a shows an example of a system according to the invention on-board a vessel in a perspective view with the pile holder in vertical orientation.

In the figures a vessel is partly indicated with reference numeral 1.

In this example, the vessel is equipped with a crane 2 configured to lift a monopile 10 for an offshore wind turbine.

For example, the vessel 1 has a deck 3 on which one or more monopiles 10 are stored in horizontal orientation, e.g. transverse to a longitudinal axis of the vessel.

The vessel 1 is equipped with an pile upending and holding system 20 according to the invention, that is configured to be mounted on the vessel 1, e.g. on a deck 3 thereof, e.g. on a deck thereof and in close proximity to the crane 2.

The system 20 is used in conjunction with the crane 2, and a pile driving device 100, for installation of the monopile 10 into the seabed. A wind turbine, e.g. with a transition piece in between, is then placed on the monopile.

Generally the system 20 comprises a support assembly 30 that is configured to be mounted on the vessel 1, e.g. on a deck 3 of the vessel, and a pile holder 50. The support assembly 30 is configured to provide compensation for wave-induced motion of the vessel 1 to maintain a predetermined X-Y location of the pile holder 50 independent of the wave-induced motion of the vessel 1.

The pile holder 50 is tiltable mounted on the support assembly 30. The pile holder 50 has a center axis 51 and is mounted such as to be tiltable about a substantially horizontal tilt axis 40 relative to the support assembly 30 between a horizontal orientation and a vertical orientation while holding the monopile 10 longitudinally, with its longitudinal axis 11, along the center axis 51. In the horizontal orientation, the center axis 51 of the pile holder is substantially horizontal, see FIGS. 1-4, 9, 11. In the vertical orientation the center axis 51 is substantially vertical, see FIGS. 5-8, 10, 13, 15, 17, 18. In FIG. 12, the pile holder 50 and the held pile 10 is in between the horizontal and vertical orientation.

The pile holder comprises a lower ring 55, an upper ring 60, and a pile holder frame 53 which supports the lower ring 55 and upper ring 60, mutually spaced along the center axis 51. Thus, the upper ring 60 is vertically above the lower ring 55 when the pile holder 50 is in substantially vertical orientation.

The lower ring 55 comprises multiple lower pile engaging devices 56, and the upper ring 60 comprises multiple upper pile engaging devices 61. The pile engaging devices are distributed about the circumference of the respective ring, see e.g. FIG. 4, each pile engaging device being adapted to be engage an exterior of a pile extending through the lower and upper ring structures, and comprises one or more pile guiding rollers 61r, most clearly visible in FIGS. 19-21.

Figure 4:
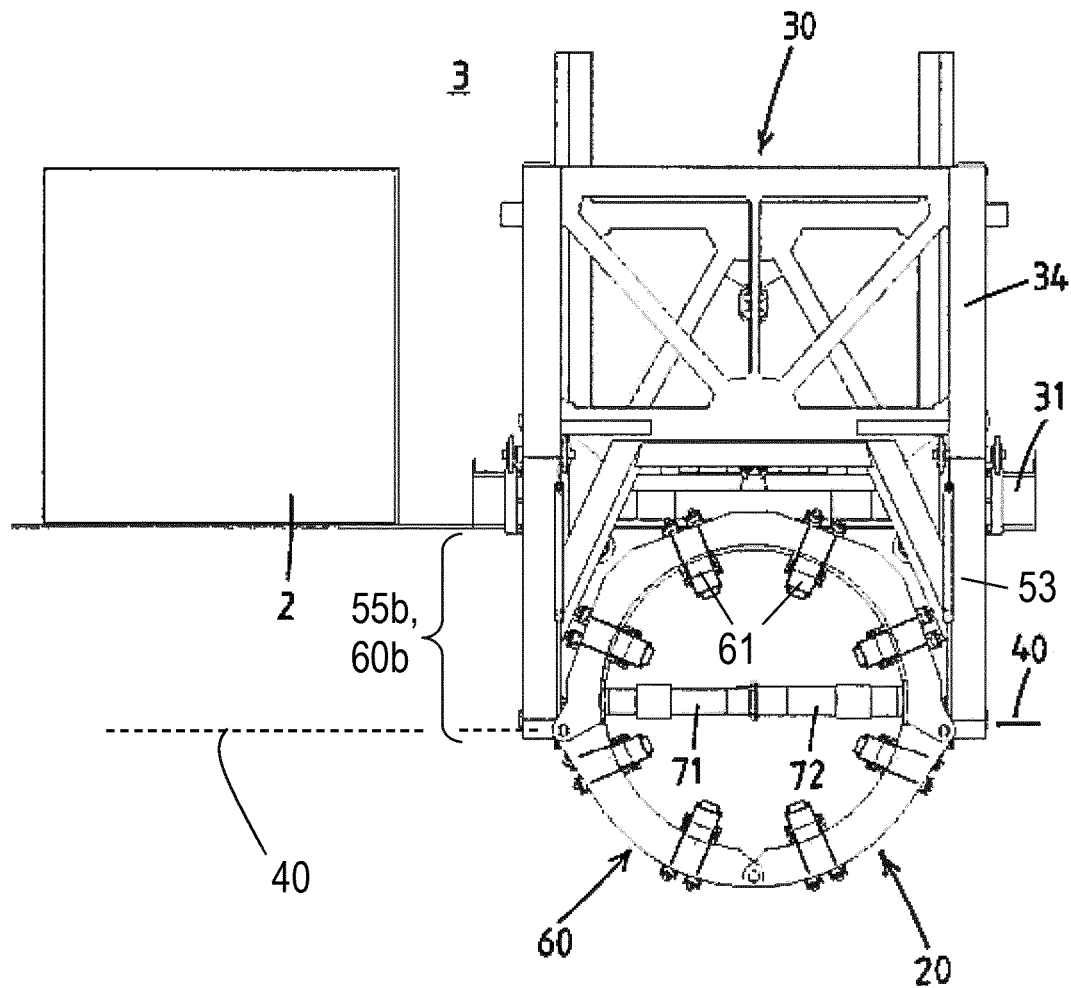
FIG. 4 shows the system of FIG. 1a in top view.
Figure 18:
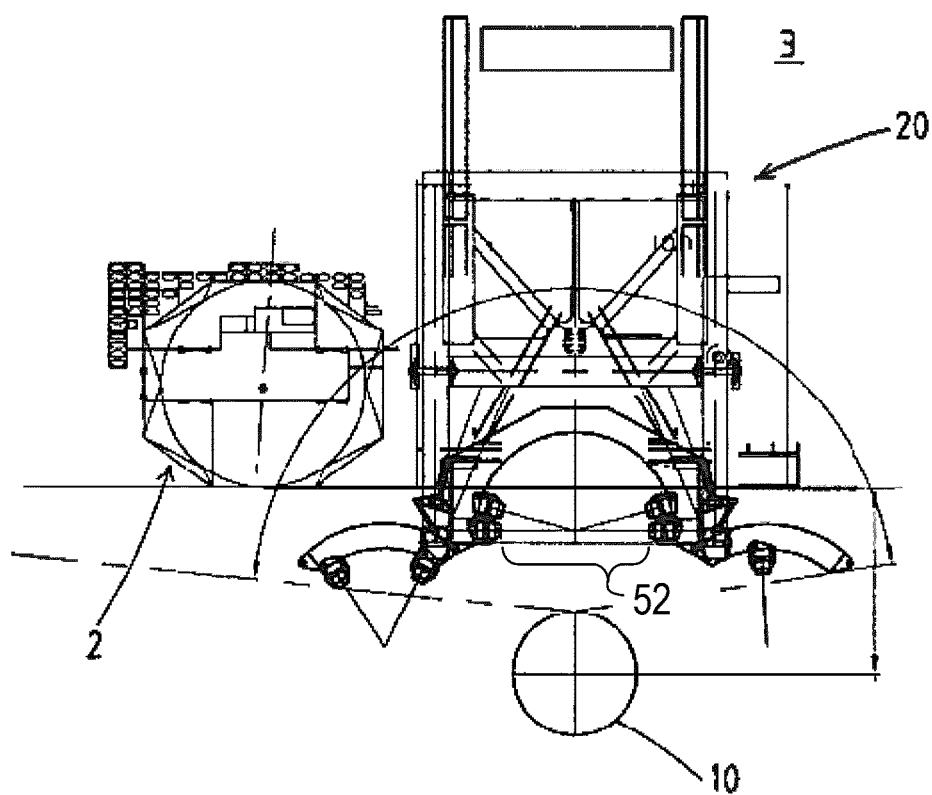
Figure 22A:
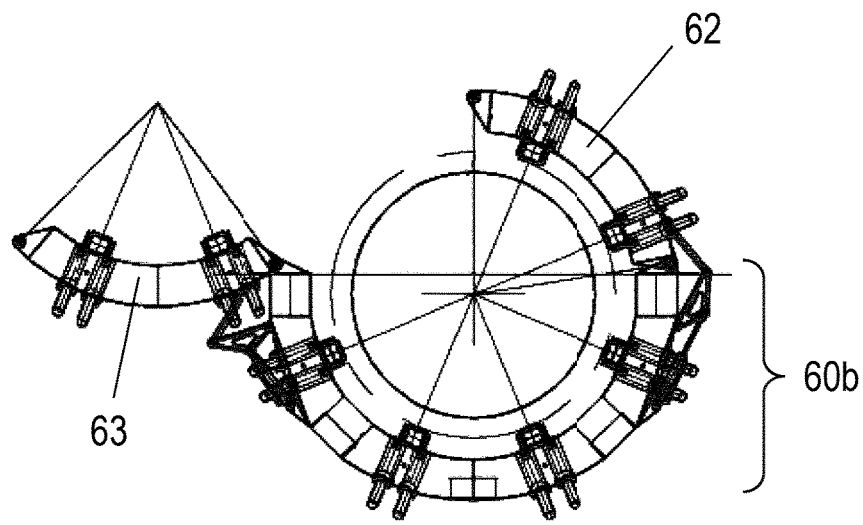
FIGS. 22a-b illustrate in a top view the upper ring of the system.
Figure 22B:
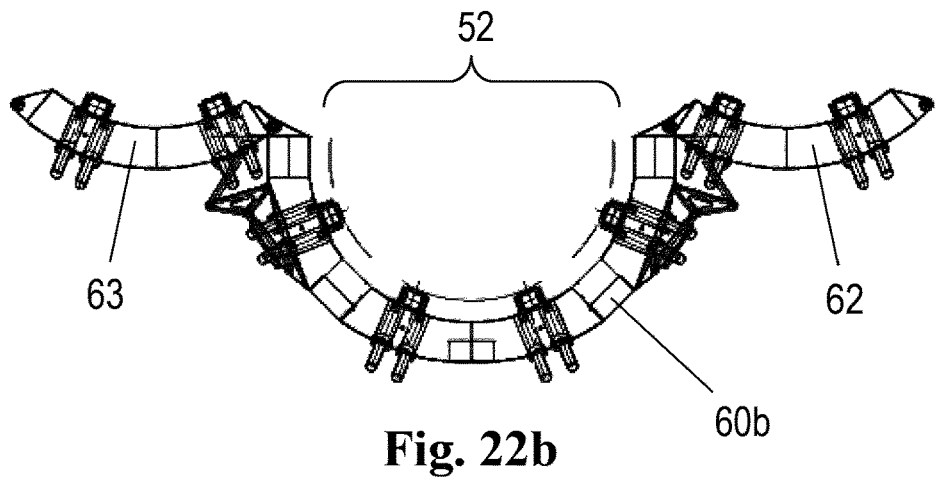
Figure 22C:
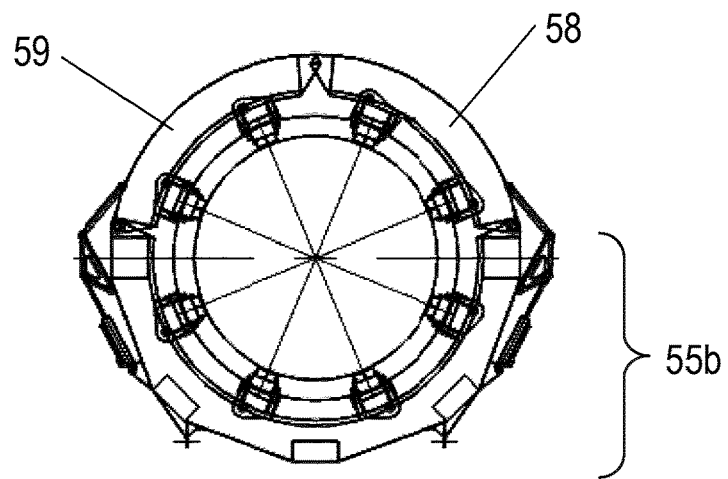
FIG. 22c illustrates in a top view the lower ring of the system.

Each of the lower ring and upper ring 55, 60 comprises a ring base 55b, 60b fixed to the pile holder frame 53, indicated in the top views of FIG. 4 and FIG. 22a,b. Each ring 55, 60 further comprises two semi-circular movable jaws 58, 59, 62, 63, each jaw being movable such as to move the rings between a closed position, wherein the rings form a closed annulus, and an opened position. In this embodiment the jaws 58, 59, 62, 63, are thereto each pivotable around respective longitudinal pivot axes. In FIG. 22a, the upper ring 60 is shown with the jaw 63 opened and jaw 62 closed, and in FIG. 22b with both jaws 62, 62 opened. With the jaws of the lower ring 55 opened as well, free ends 55e of the ring 55 define together with free ends of the ring 60 define an opening 52 of the pile holder 50 for entry of the pile 10. In FIG. 22c the lower ring 55 is shown with both of its jaws 58,59 closed. The lower ring 55 has the same functionality for the opening and closing of its jaws 58, 59 as shown for the upper ring 60 in FIGS. 22a and 22b. In FIG. 18, the jaws of both rings 55,60 are in the opened position. In the opened position, the rings 55,60 between free ends thereof define an entry opening 52 of the pile holder 50 for entry of the pile 10 into the pile holder 50 to extend through the lower and upper ring 55, 60 with the longitudinal axis 11 of the pile 10 extending along the center axis 51. The entry opening 52 is indicated in FIGS. 18 and 22b. In the closed position, the respective ring 55, 60 forms a closed annulus enclosing the pile 10 extending through the rings 55, 60 as shown for the lower ring in FIG. 22c, and for both rings in FIGS. 1-13, 15, 17.

Figure 10:
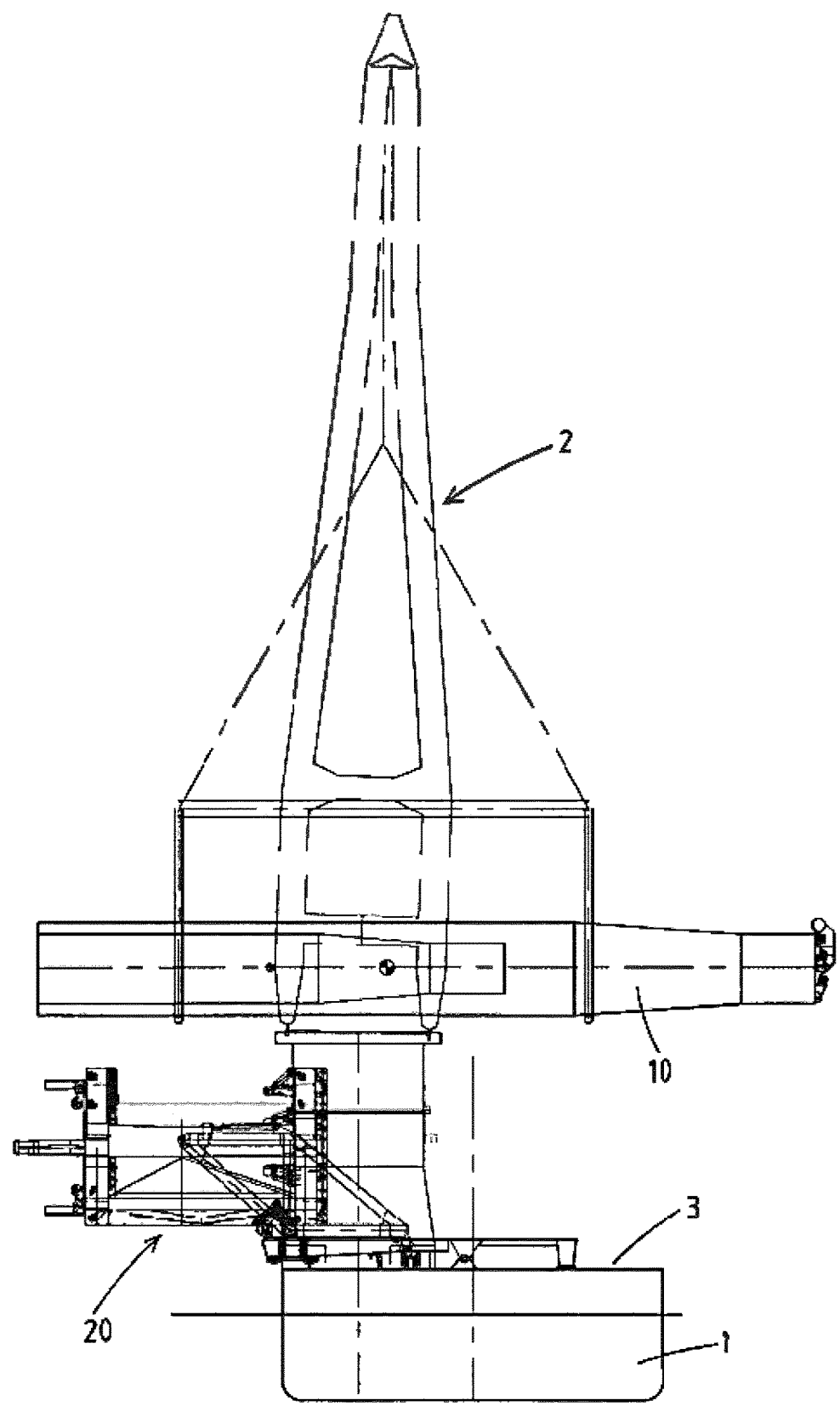

The provision of the openable jaws 58, 59, 62, 63 enables the pile 10 to be introduced into the pile holder 50 in a radial direction. This may be envisaged from FIG. 10. In the shown horizontal orientation of the pile holder 50, the pile 10 can advantageously be introduced in a horizontal orientation into the pile holder 50. In the shown embodiment the entry opening 52 extends substantially horizontally in the horizontal orientation of the pile holder, so that the pile can be introduced from above into the pile holder by a crane. In FIG. 10, the crane supports the pile 10 in the vertical orientation using a yoke, prior to opening of the jaws 58,59,62,63 of both rings and lowering the pile 10 by the crane into the pile holder 50 via the entry opening 52 created.

The pile holder 50 is embodied so that, when the pile holder 50 is in the horizontal orientation, the ring base 55b, 60b of each ring forms a bottom section of the annulus, for supporting the pile 10 when received in the pile holder 50. This may be envisaged from FIG. 10 combined with FIG. 22b.

The pile holder 50 is provided, below the lower ring 55 thereof, with a pile foot end support 70 that is secured to the pile holder frame 53 and that is configured to engage with the lower end portion of the pile in order to limit longitudinal movement of the pile 10, at least during upending of the pile 10. Such upending process is illustrated by the consecutive progression of FIGS. 11, 12 and 13.

The tilt axis 40 of the system is located longitudinally between the lower ring 55 and the upper ring 60, namely substantially in the middle there between. Thus in the vertical position, the tilt axis 40 extends vertically in the middle between the rings.

Figure 21:
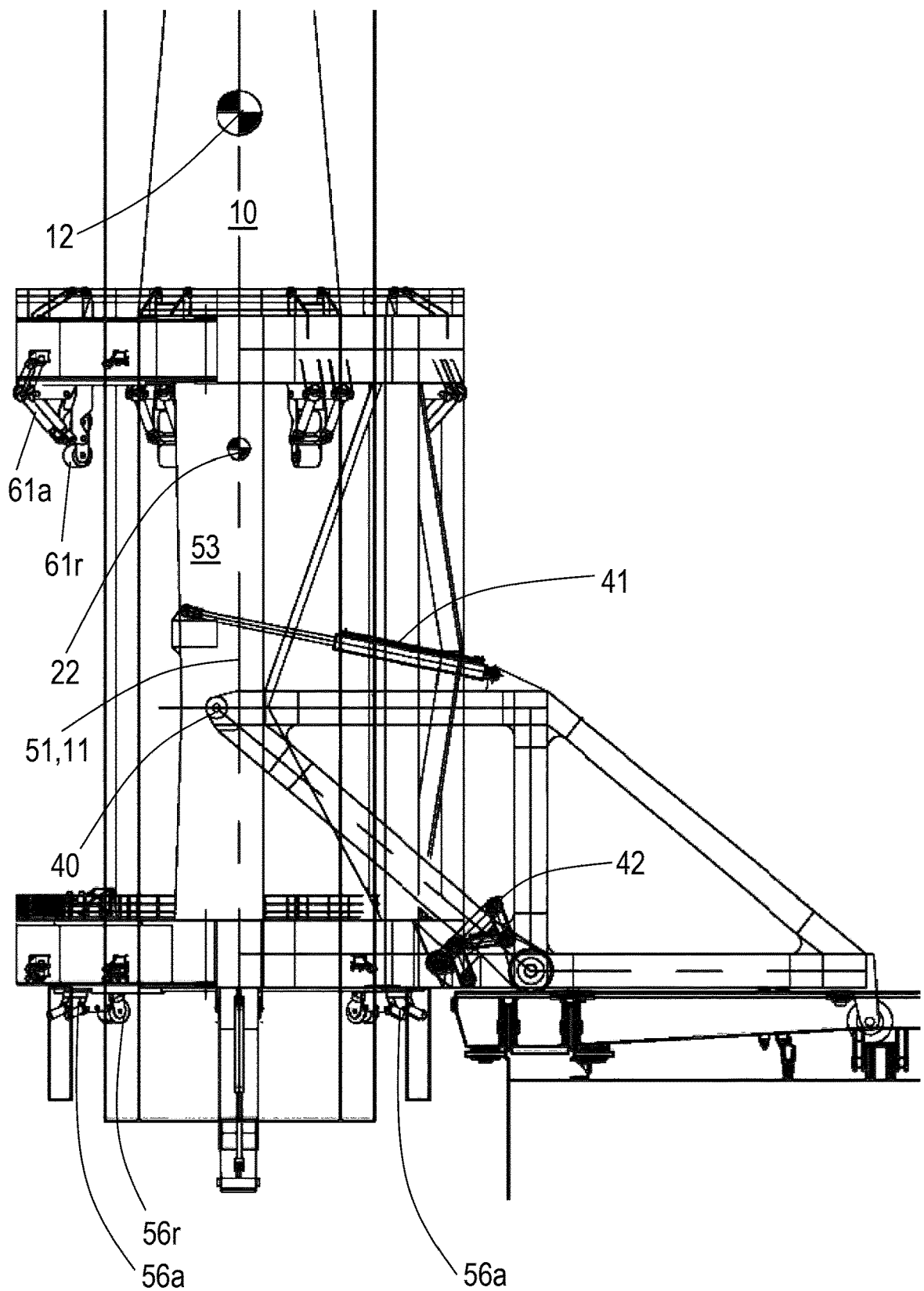
FIG. 21 illustrates the system in a detailed side view.

The system 20 comprises one or more, here two, tilt actuators 41, operative between the support frame 30 and the pile holder 50, see e.g. FIG. 21. The tilt actuators 41 are configured to move the pile holder 50 between the horizontal orientation and the vertical orientation thereof. During upending, the tilt actuators 41 may be operated to apply a force to the pile holder 50 such as to tilt it forwardly, about the tilt axis, from the horizontal to the vertical orientation, see the advancement of FIGS. 11-13. Therewith, the tilt actuators 41 at least assist the crane 2 in upending the pile 10. The one or more tilt actuators 41 may also be operated to decelerate the upending movement, for example in the last part of the upending movement, e.g. to dampen a forward momentum of the pile 10, such as to reduce the risk of the pile 10 to overshoot and topple forward.

Figure 5:
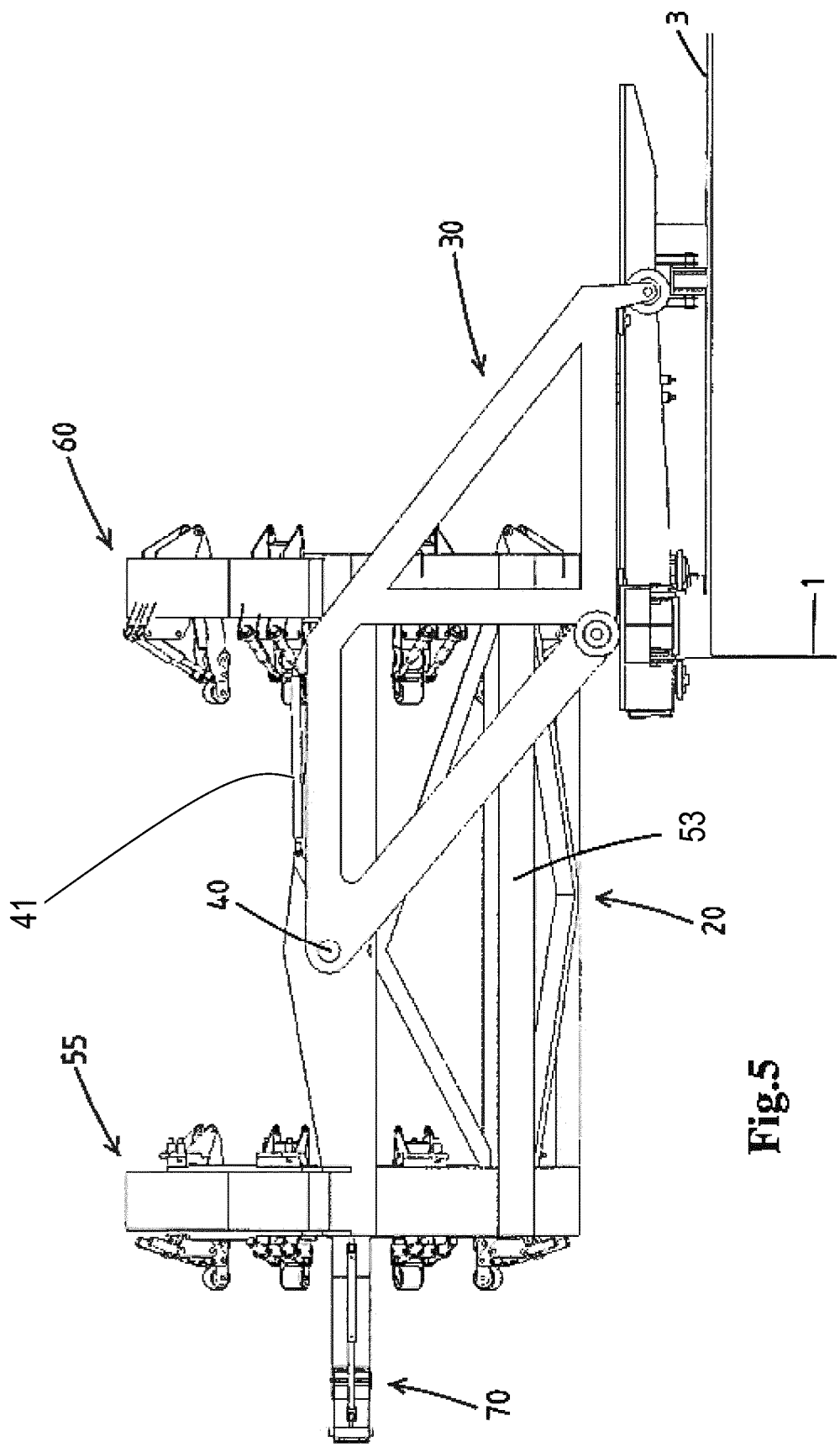
FIG. 5 shows the system of FIG. 1a with the pile holder in horizontal orientation, seen in side view.
Figure 6:
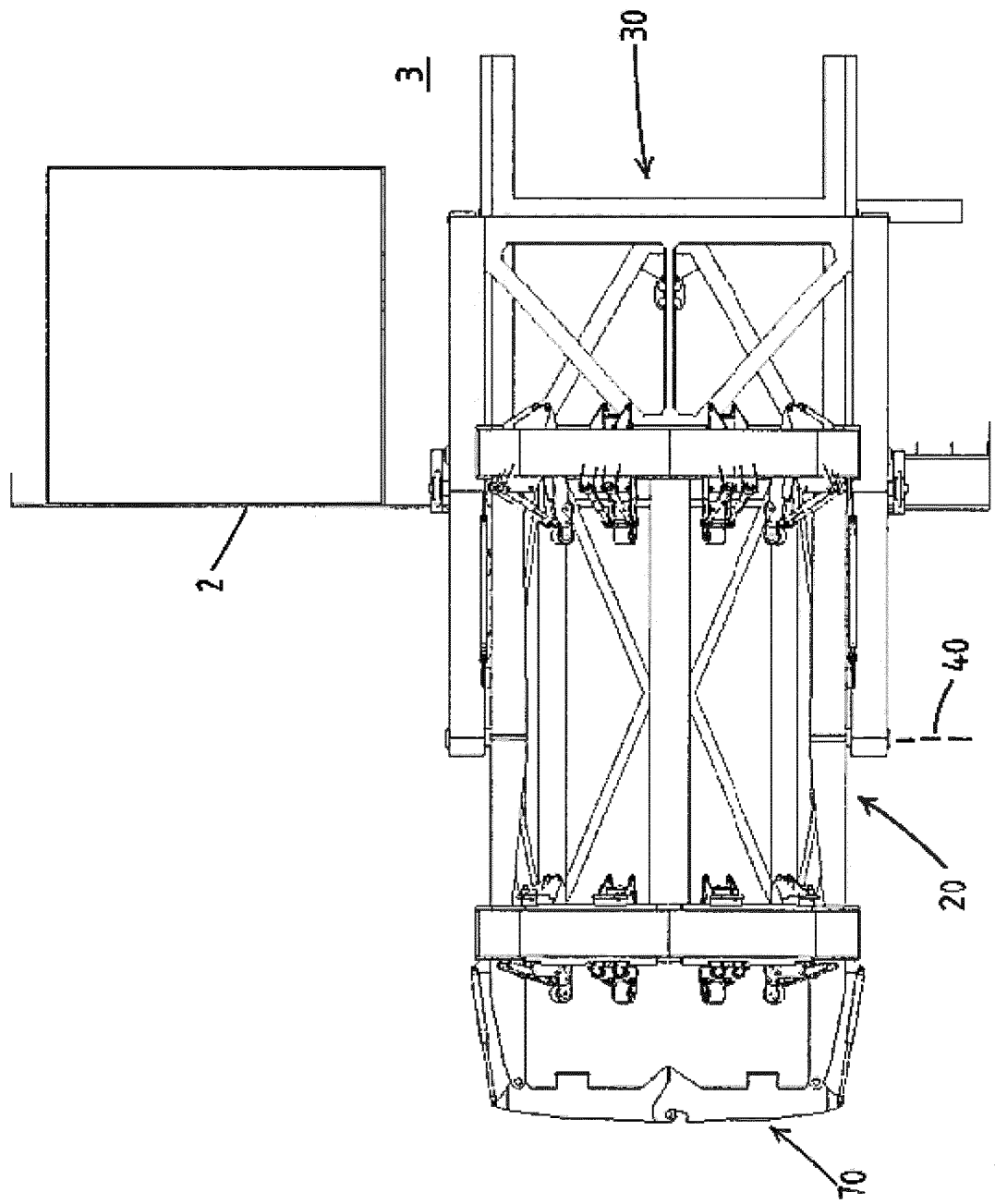
FIG. 6 shows the system of FIG. 5 in top view.
Figure 7:
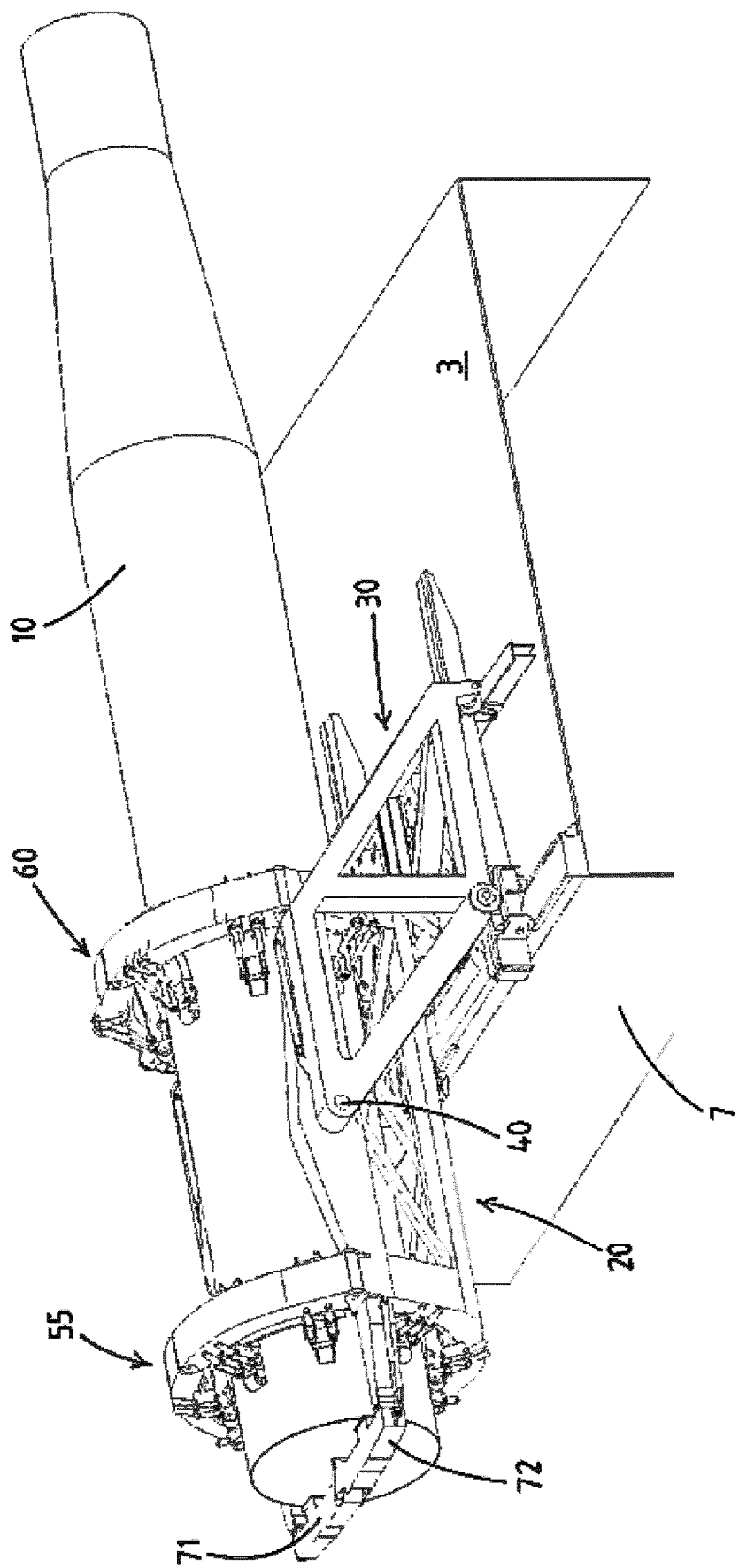
FIG. 7 shows a monopile for a wind turbine placed horizontally in the system of FIG. 1a, in a perspective view.
Figure 8:
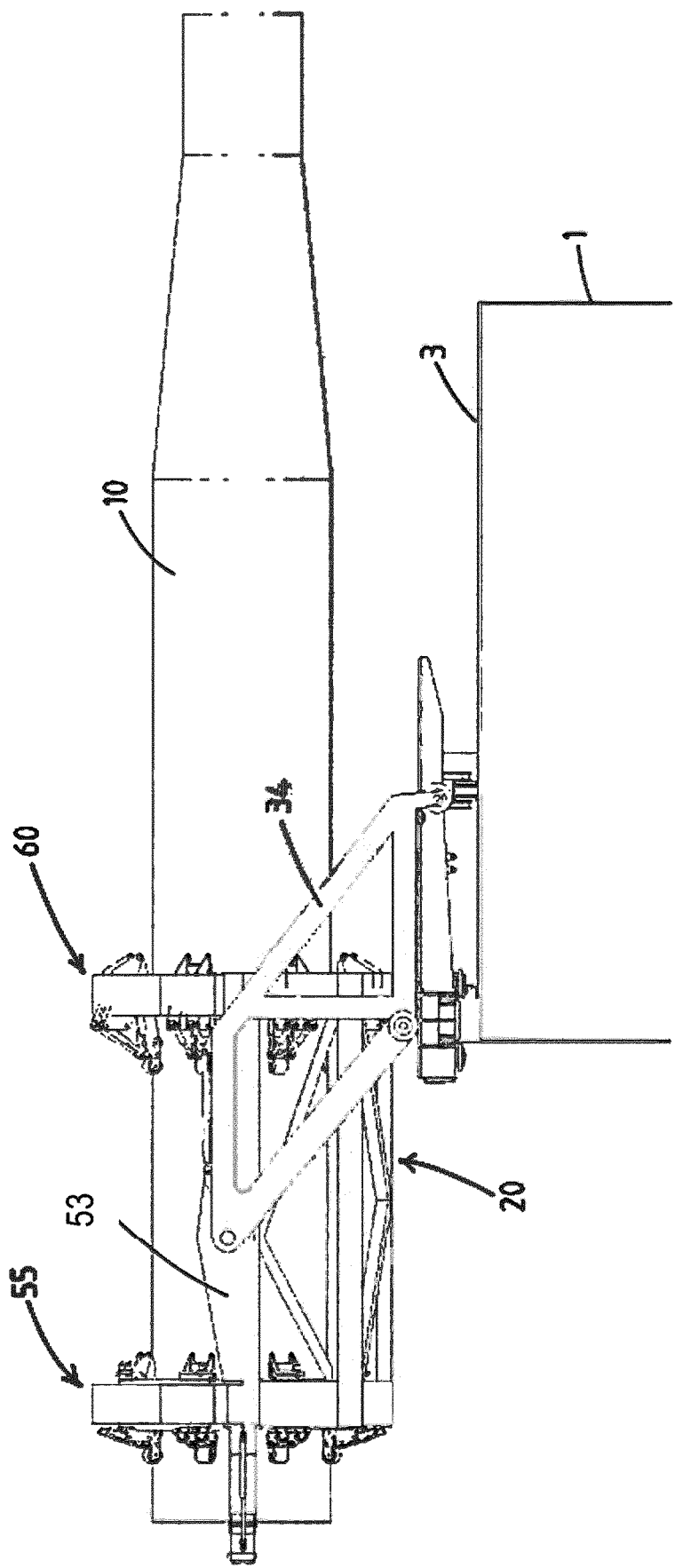
FIG. 8 shows the system of FIG. 7 in side view.
Figure 9:
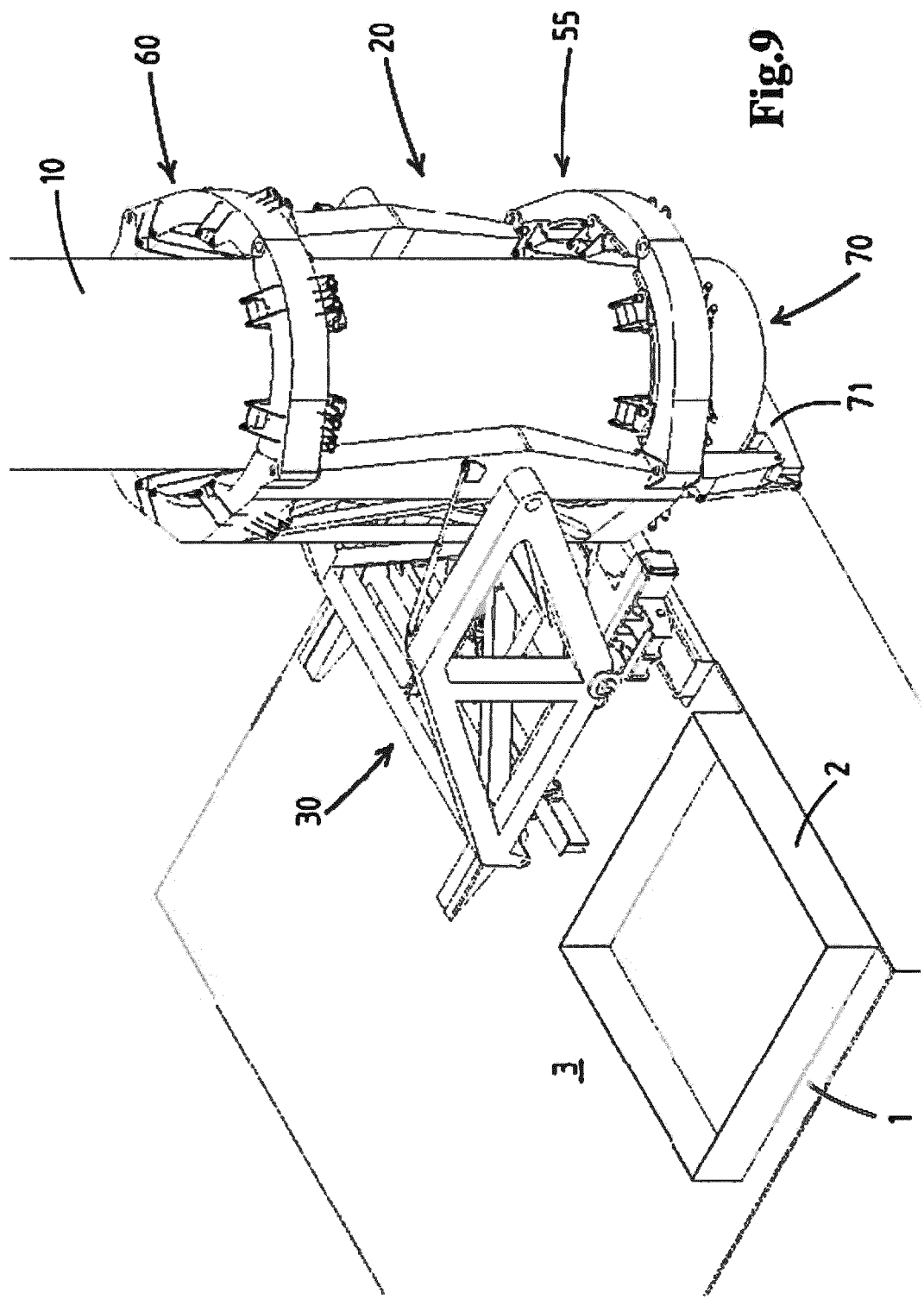
FIG. 9 shows the situation wherein the pile has been upended using the system of FIG. 1a, FIG. 10 illustrates placing the monopile with a crane in the system of FIG. 1a, FIG. 11 illustrates connecting a crane to the upper end of the horizontal oriented pile.

Furthermore, the tilt actuators 41 are operable to apply a force to the pile holder 50 such as to tilt it backwardly, about the tilt axis 40 from the vertical to the horizontal orientation, for example after an installation procedure of a pile, e.g. back to the horizontal position shown in FIGS. 5 and 10 in order to receive another pile to be consequently installed.

Furthermore, the one or more tilt actuators 41 may provide controllability of the upending movement additional to the control of the operation of the crane 2.

The tilt actuators 41 may be operated to correct tilting of an upended pile prior to and during lowering to the seabed, e.g. over small vertical angles.

In the shown embodiment, the tilt actuators 41 are hydraulic tilt cylinders, of which the piston is connected to the pile holder 50, and the cylinder to the support assembly 30. As is preferred the hydraulic tilt cylinders 41 are connected to the pile holder 40 at a location above the tilt axis 40 and forward thereof when the pile holder 50 is in the vertical orientation. As visible in e.g. FIG. 5, in the horizontal orientation of the pile holder 10, the tilt cylinder 41 is retracted and extends substantially horizontally.

The support assembly 30 is provided, here longitudinally at a distance below the tilt axis 40, with a catching and retarding mechanism 42, see e.g. FIG. 21.

The catching and retarding mechanism 42 is configured to, in a range of angles of the center axis 51 from a predetermined backward tilting angle to a vertical orientation, engage the pile holder 50 and apply a force to the pile holder 50 such as to decelerate a forward tilting movement of the pile holder 50 and the pile 10 held thereby. The effect is that in a last part of the upending movement, as soon as the pile holder reaches the predetermined backward tilting angle, the pile holder 50 is engaged by the catching and retarding mechanism 42. The further tilting around the tilt axis 40 until the pile holder is in its vertical orientation is then damped by the force applied by the mechanism 42. Thereby, the catching and retarding mechanism 42 decelerates the upending movement, in particular the last part thereof, such as to dampen a forward momentum of the pile 10, reducing the entailed risk of the pile 10 to overshoot and topple forward and/or placed undue loads on the pile holder.

The catching and retarding mechanism 42, in embodiments, comprises one or more hydraulic cylinders, which are, for example, fully extended when engaging the pile holder at the predetermined backward tilting angle and shorten or retract as the backward tilting angle decreases, e.g. with a hydraulic circuit providing a dampening effect.

In embodiments, the catching and retarding mechanism 42 is automatically releasably connectable to the pile holder 50 directly after engagement of the pile holder 50 with a forward end thereof which is a free end prior to the connection.

The catching and retarding mechanism is, preferably, furthermore configured to—in a range of angles of the center axis 51 from a vertical orientation to a predetermined forward tilting angle—remain engaged with the pile holder 50 and apply a forward force to the pile holder 50 below the tilt axis 40 such as to decelerate a forward tilting movement of the pile holder 50 and the pile held thereby. Thereby, the catching and retarding mechanism 42 counteracts a forward tilting movement of the pile 10, reducing the entailed risk of an upended pile to overshoot and topple forward. The tilt actuators 41 may be used to counteract a backward tilting movement of the pile holder and the pile held thereby.

Figure 1B:
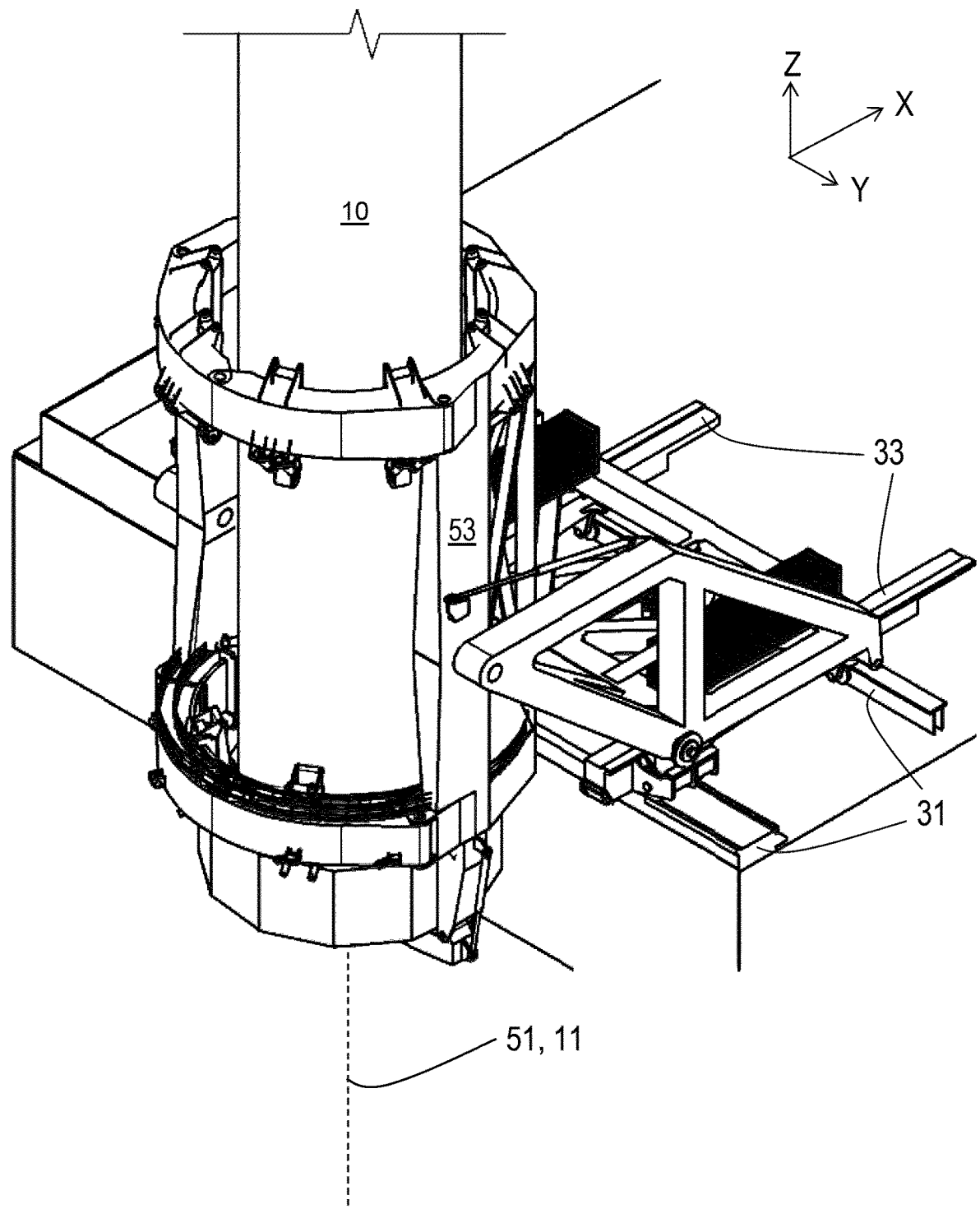
FIG. 1b shows the system of FIG. 1a on-board a vessel in a perspective view with the pile holder in vertical orientation while holding a monopile after upending.
Figure 2:
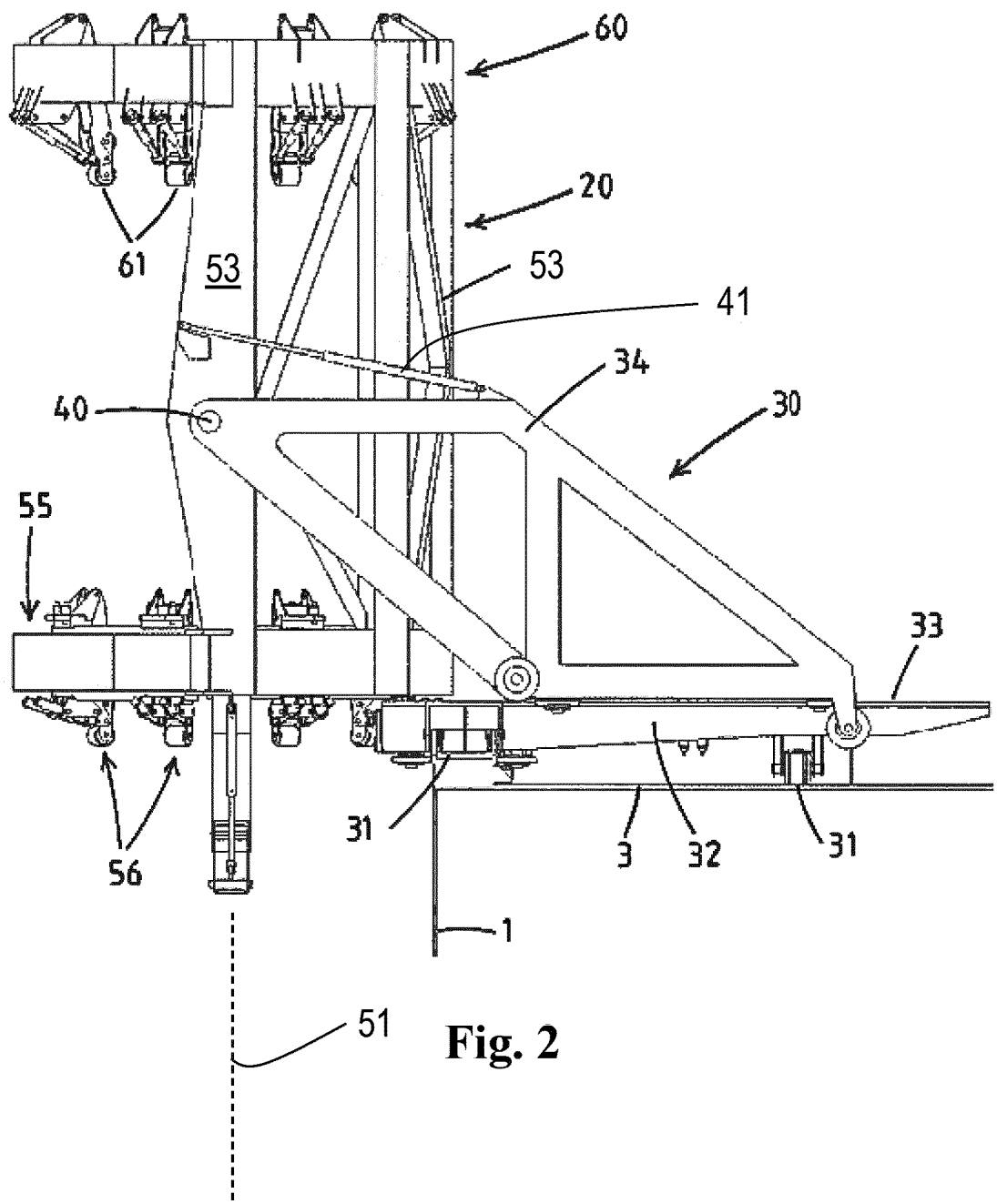
FIG. 2 shows the system of FIG. 1a in side view.
Figure 3:
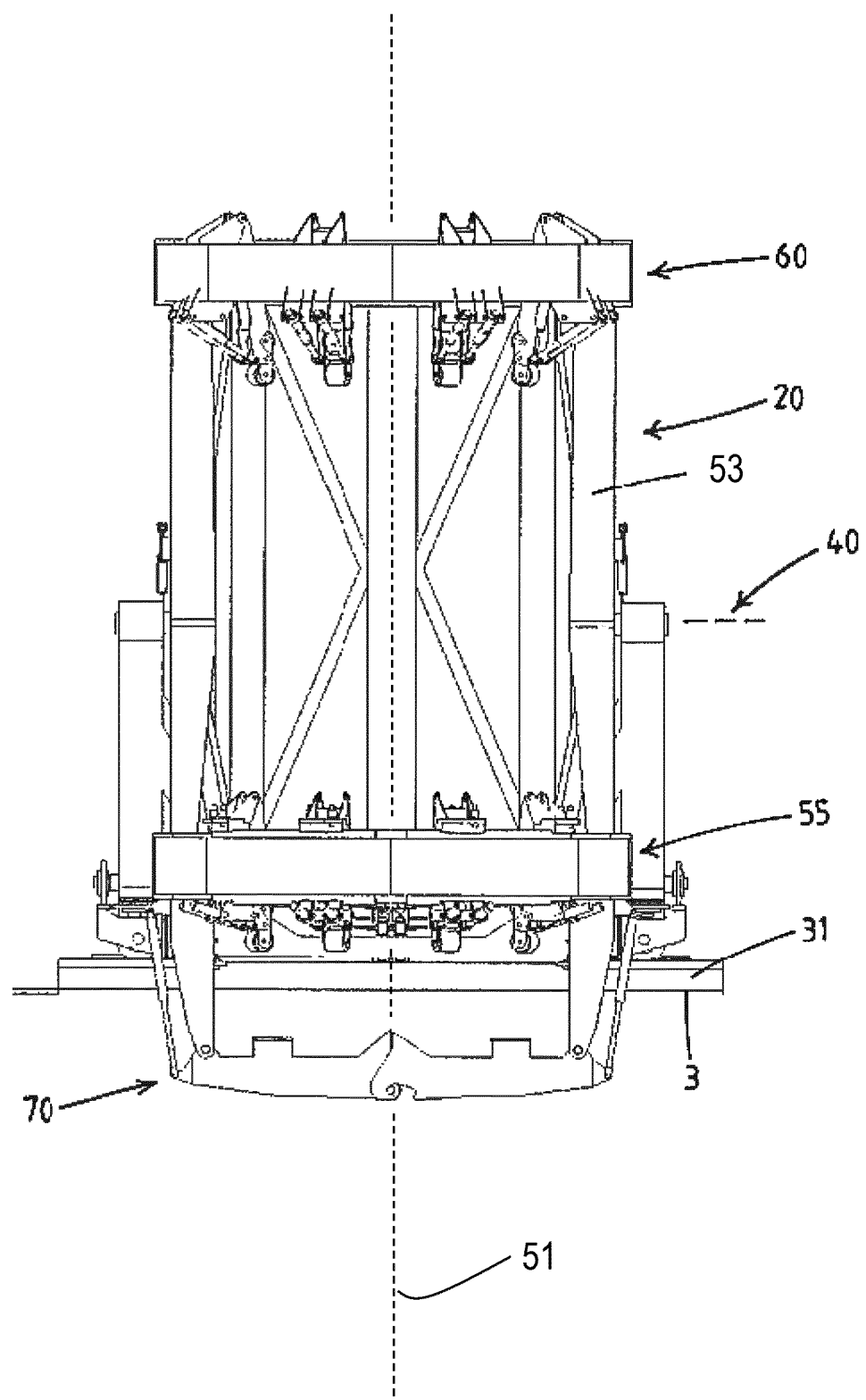
FIG. 3 shows the system of FIG. 1a in front view.

Referring to FIG. 1b, the support assembly 30 comprises one or more Y-rails 31 extending in the Y-direction, a positioning frame 32 movably supported on said one or more Y-rails. The positioning frame is provided with one or more X-rails 33 extending in the X-direction. A support frame 34 is movably supported on said one or more X-rails in said X-direction. The pile holder is tiltable supported by the support frame about the tilt axis 40. As preferred, the tilt axis 40 extends in the Y-direction, e.g. parallel to a port or starboard side of the hull of the vessel.

Figure 19:
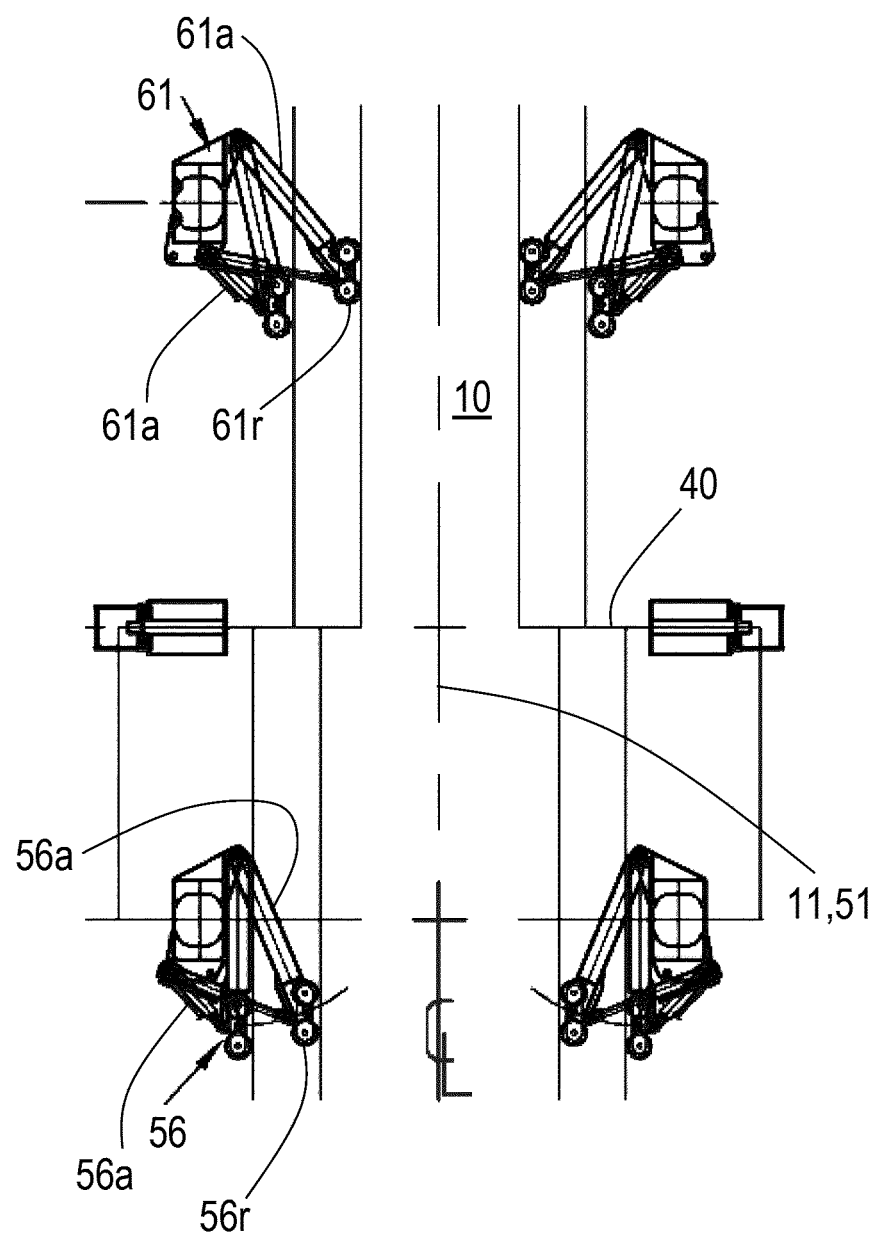
Figure 20:
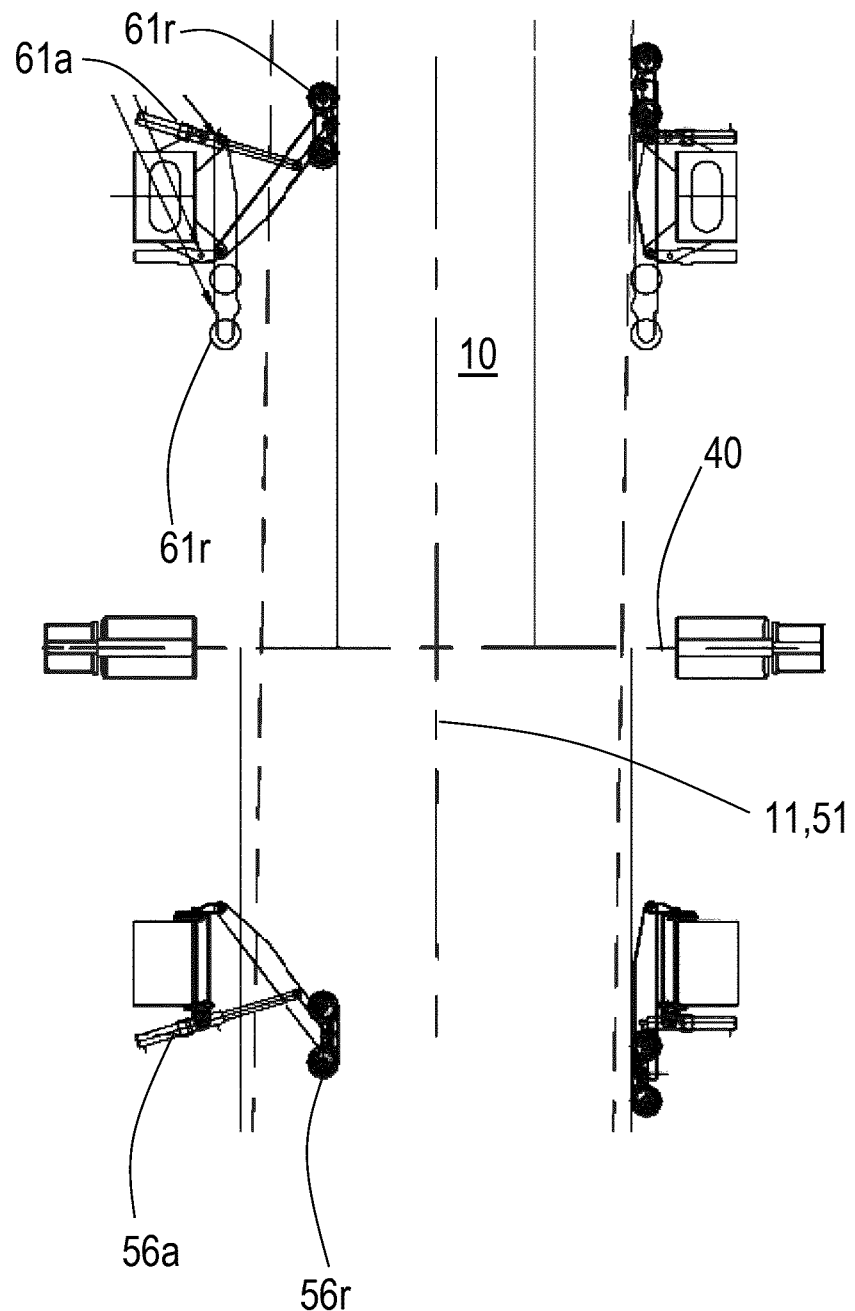

The pile engaging devices 56, 61 of both rings 55, 60 are each movable relative to the respective ring structure of the lower and upper ring, respectively. In FIGS. 19 and 20, different possible pile engaging devices 56, 61 are shown in a schematic in which piles 10 with differently sized circumferences are shown in one figure. The pile engaging devices are shown while engaging the pile exteriors at the different circumferences.

Firstly, both the lower and upper pile engaging devices 56, 61 are movable a radial direction relative to the respective ring structure by one or more respective actuators 56a, 61a of the respective ring 55, 60. The lower pile engaging devices 56 are movable independently from the upper pile engaging devices 61, so that as illustrated in FIGS. 19 and 20, they are able to engage differently sized circumferences of the pile 10. The independent radial movability of the devices 56, 61 enables these to continuously hold and guide a pile with a longitudinally varying outer circumference during lowering. Thereby, the devices 56, 61 are able to remain in engagement with the exterior of the pile 10 extending through the rings 55, 60 while a tapered section of the pile 10 passes through the rings along the center axis 51. The pile 10 shown while being lowered in FIG. 17, has such tapered section. The tapered section tapers upwardly, and is in FIG. 17 above the upper ring 60, about to extend through the rings 55, 60 when the pile 10 is lowered further. The upper pile engaging devices 61 will move radially inwards further than the lower pile engaging devices 56 as the tapered section extends through the rings.

Further, the pile engaging devices 56, 61 of each ring are movable individually, independently from each other, such that local obstructions on the exterior of the pile 10 can pass the pile holder 50 during lowering.

The pile engaging devices 56, 61 are actively radially movable by respective actuators 56a, 61a, so that the engagement and disengagement by the devices 56, 61 of the exterior of the pile 10 held by the pile holder 50 is controllable by operation of these actuators 56a, 61a, e.g. during a lowering stage. Each pile engaging device 56, 61 has a separate associated actuator 56, 61, so that the radial movements of the pile engaging devices 56, 61 are individually controllable, independently from each other. The actuators 56a, 61a are embodied as hydraulic cylinders. In FIG. 19, each device 56, 61 is shown with the rollers in two positions, engaging a smaller diameter pile and a larger diameter pile, as associated with two positions of the respective actuators 56a, 61a. In FIG. 20 the leftmost devices are shown engaging a smaller diameter pile and the rightmost devices are shown engaging a larger diameter pile.

The active radial movability of the pile engaging devices 56, 61 allows for radial (re)positioning of the pile 10 being held. For example, the lower pile engaging devices 56 are radially moved to correct a tilting of the pile 10, or both the lower and upper pile engaging devices 56, 61 are used to adjust a horizontal position of the pile 10 when in vertical orientation. Moreover, the active radial movability for example enables the pile holder 50 to be adjustable to a range of pile circumferences, so that it is configured to hold piles with different diameters. The pile engaging devices 56, 61 may prior to receipt of a pile be moved to a radially inwards position in case of a small diameter pile, and moved to a radially outwards position for holding a large diameter pile.

The radial movability of each of the pile engaging devices 56, 61 enables that radial motions of the pile relative to the vessel 1 may be absorbed, and/or at least partly compensated, e.g. completely compensated, e.g. passively. In the vertical position of the pile holder 50, thereby the pile may be held in a stationary radial position relative to the vessel 1, for example, when the X-Y compensation of the support assembly 30 is not being applied.

The radial movability also enables to incorporate a ring damping mechanism between the pile engaging devices 56, 61 and the ring structures.

The system 20 comprises such ring damping mechanism in the upper ring 60 of the pile holder 50. For example, this damping mechanism is embodied by the hydraulic cylinders associated with the pile guiding devices which are configured and operated to suppress oscillation of the monopile during upending and/or lowering, and/or to suppress an undesired tilting of the upended pile 10 relative to the pile holder.

In an embodiment, the ring damping system is configured and operated to passively dampen movements of the pile in the radial plane of the ring 60, e.g. only in the upper ring, e.g. dissipating energy from the radial movements of the pile engaging devices 61 involved in such oscillation or tilting. For example, to achieve this dampening, the cylinders of the pile engaging devices in the upper ring 60 are configured and operated to passively shorten and extend upon radial movements of the pile engaging devices 61 relative to the ring structure of the upper ring 60 and thereby dissipating energy.

It is illustrated that the pile engaging devices 56 of the lower ring 55 are each movable, e.g. by a drive, e.g. a rack and pinion drive, associated with each device 56, relative to the ring structure of the lower ring 55 along a corresponding arc segment of the closed annulus formed by the lower ring 55 so as to allow for adaptation of the angular position of the pile engaging devices 56 relative to the ring structure. If such adaptation is done whilst the device 56 is engaged with the pile exterior the pile may be rotated over an angle around its vertically oriented longitudinal axis 11, e.g. into a desired angular position.

It is illustrated that the pile engaging devices 61 of the upper ring have a fixed angular position relative to the ring structure of the upper ring 60. Of course, the devices 61 could be movable over an arc as described above as well.

The devices 56, 61 are each, as discussed herein, also actively radially movable, so that the actuators 56a, 61a may be operated to move some of the devices 56, 61, e.g. all devices 61, outwardly such that these disengage the pile exterior and hold these cleared from the pile 10 while the other pile engaging devices, e.g. all devices 56, remain engaged with the pile exterior and move along respective arc segments to move the pile 10 angularly about the longitudinal axis thereof. After the angular movement is completed, the upper pile engaging devices 61 are then moved radially inwardly to again engage the pile exterior.

The pile engaging devices 56 may be moved radially outwardly by operation of their respective actuators 56a such as to clear the pile exterior, and while held clear from the pile exterior, be moved along their arc segments, e.g. to their initial positions, after which they may be moved back radially inwardly to engage the pile exterior.

For example, all of the lower pile engaging devices are movable over an arc relative to the lower ring, while the upper pile engaging devices are fixed on the upper ring to remain in the same angular position. Other configurations are also possible.

It is illustrated that the pile foot end support 70 comprises one or more pivotal arms 71, 72, e.g. a pair of opposed pivotal arms 71, 71, that are movable into an operative position wherein the one or more pivotal arms 71, 72 extend underneath the longitudinal end portion of the pile, e.g. their inner ends being connected, and an opened position wherein the one or more pivotal arms 71, 72 are cleared from the longitudinal end portion of the pile.

As illustrated in FIGS. 10-17 the system 20 is envisaged for use in a method for upending and installation of a pile 10 in the seabed, wherein the method comprises, with the vessel 1 in floating condition:

a. transporting a pile 10 in a horizontal orientation to an offshore installation site, e.g. using vessel 1 or a barge or the like;

b1. positioning the pile holder 50 in a horizontal orientation;

b2. opening the jaws 58, 59, 62, 63 of the lower and upper rings 55, 60, c. with the pile holder in the horizontal orientation, placing the pile 10 in horizontal orientation with a first longitudinal end portion thereof on the bases of the lower and upper rings 55, 60, d. closing the jaws 58, 59, 62, 63, e. upending the pile 10, using crane 2, into vertical orientation by means of lifting a second longitudinal end portion of the pile 10, so that the pile 10 held at the first longitudinal end portion thereof by the pile holder 50 tilts about the horizontal tilt axis 40, wherein the pile foot end support 70 limits longitudinal movement of the pile 10, during the upending of the pile 10, f. disengaging the pile foot end support 70 from the first longitudinal end portion of the pile 10; and g. lowering the pile 10 into the water while being held and guided by pile engaging devices of the pile holder 50.

Figure 11:
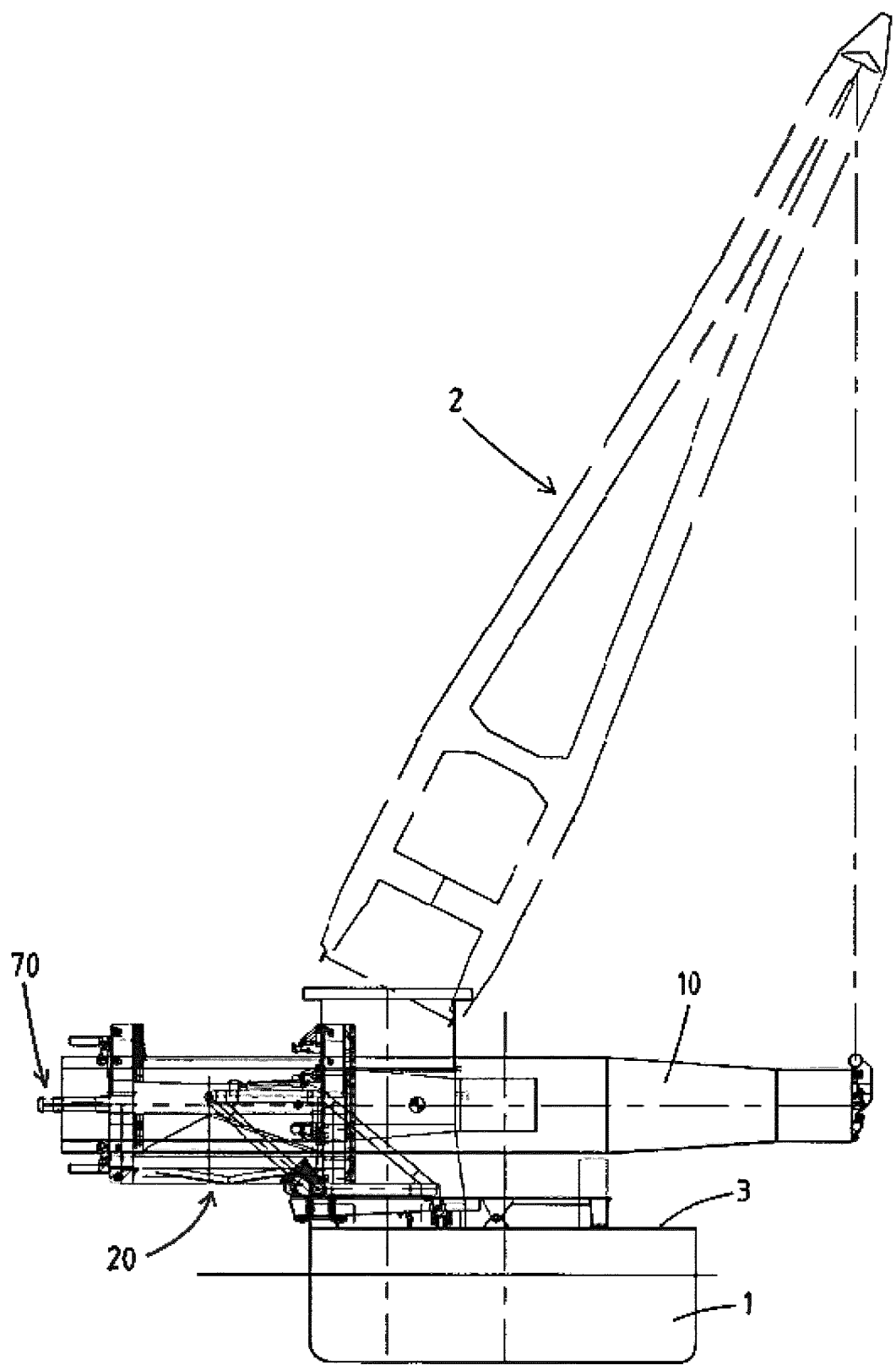
Figure 12:
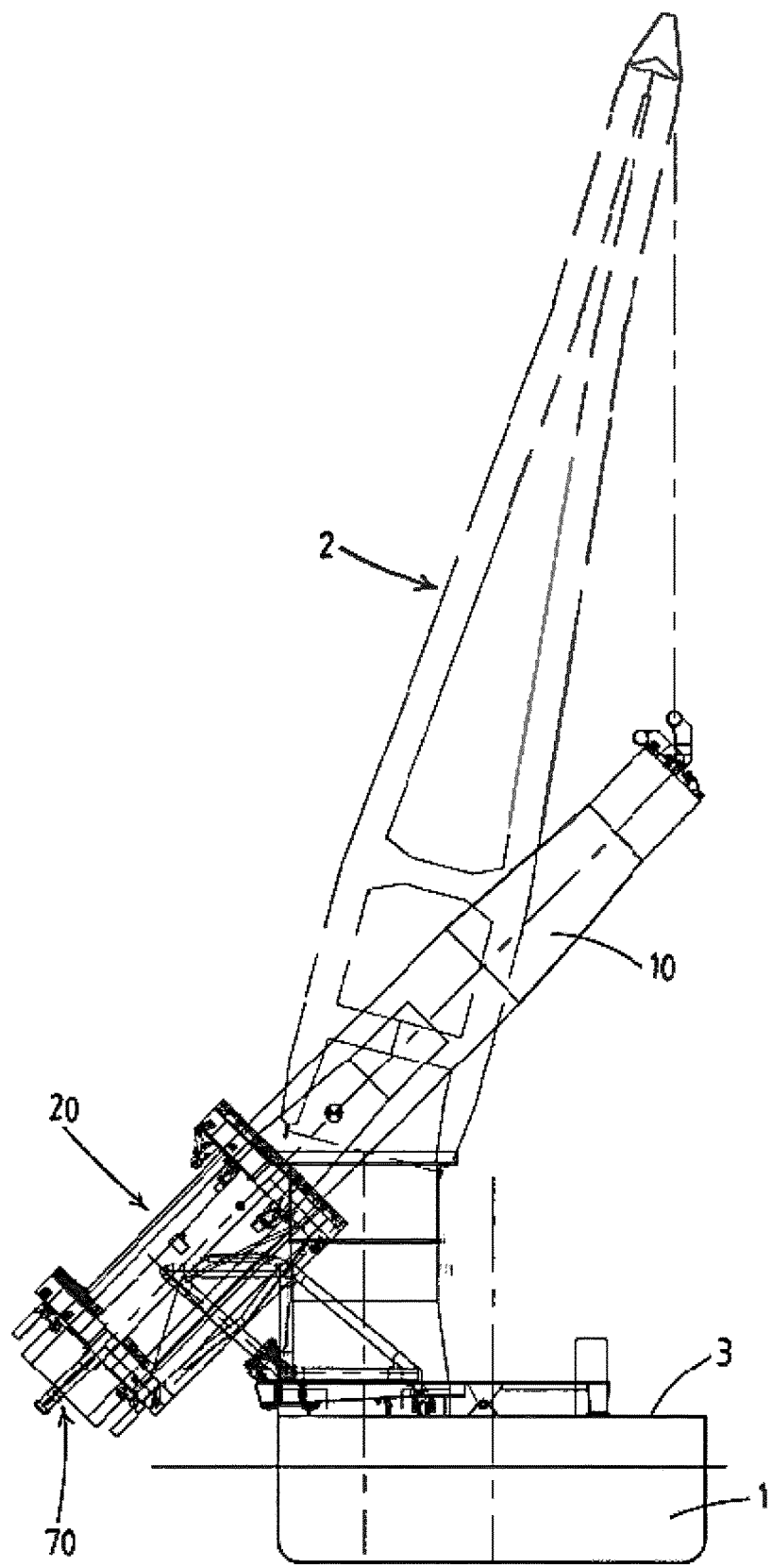
FIG. 12 illustrates the upending of the pile using the system of FIG. 1a and a crane.

FIG. 10 illustrates the system 20 on a vessel 1 after step b1 and FIG. 11 after step d. In FIG. 12 the system 20 is illustrated halfway step e, and in FIG. 13 after step e.

Figures 13, 14:
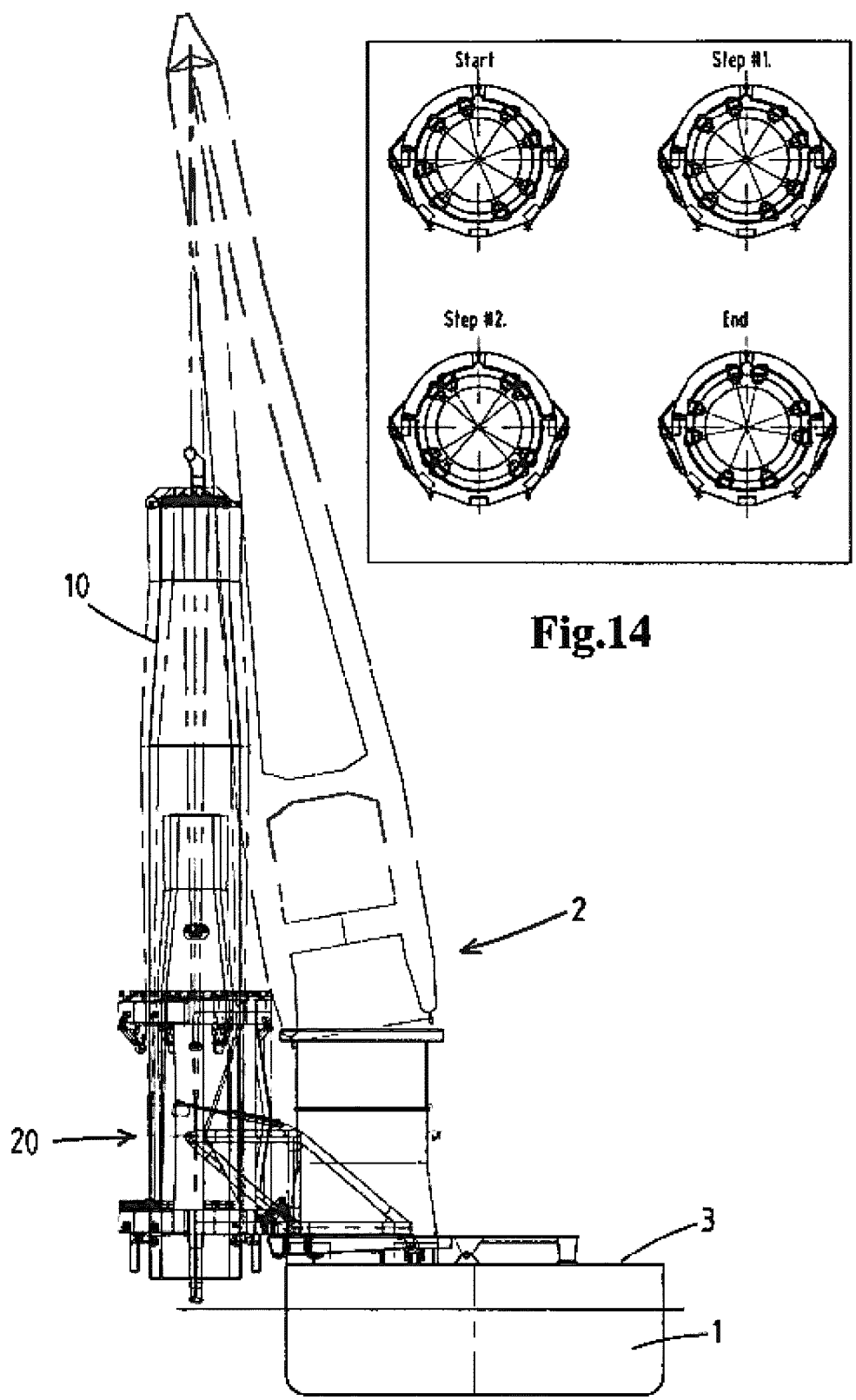
FIG. 13 illustrates the pile in upended, vertical orientation, retained by the system of FIG. 1a and the crane.
FIG. 14 illustrates the change of angular orientation of the pile using the system of FIG. 1a, FIG. 15 illustrates clearing the pile foot end support from the upended pile.

In FIG. 14, top views of the rings 55, 60 illustrate an angular adjustment process. Progressing from start to step #1, half of the pile engaging devices are moved radially outwardly to disengage the pile 10. At step #2, the other half of the upper pile engaging devices 56 have been moved along their respective arc segments to angularly move the pile 10, until abutting the adjacent disengaged pile engaging devices. At the end, all pile engaging devices have moved further angularly to the desired angular position of the pile 10. During the angular adjustment process, the pile 10 continuously remains engaged by half of the pile engaging devices 56, 61.

Figures 15, 16:
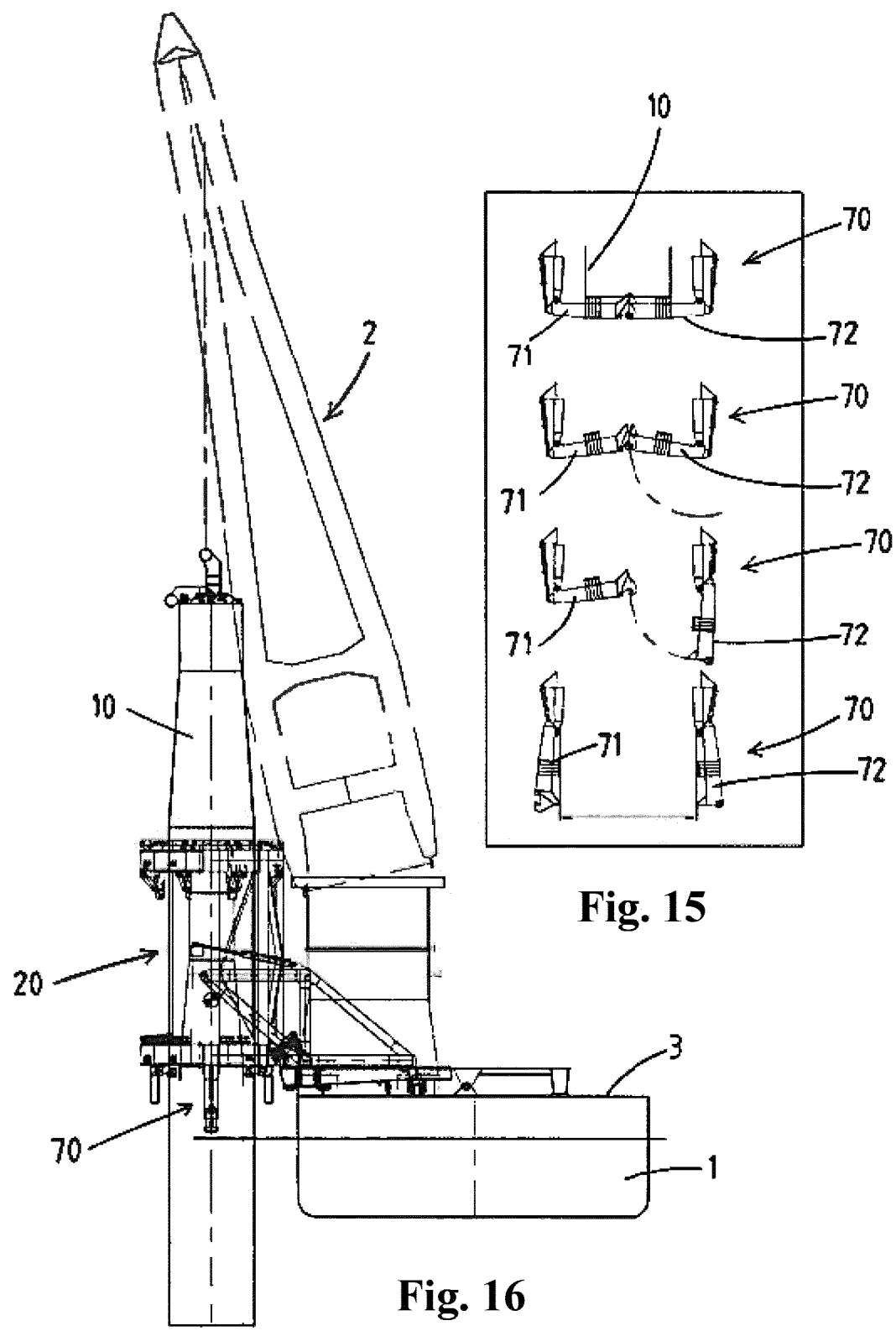
FIG. 16 illustrates lower the pile through the system of FIG. 1a using the crane.
Figure 17:
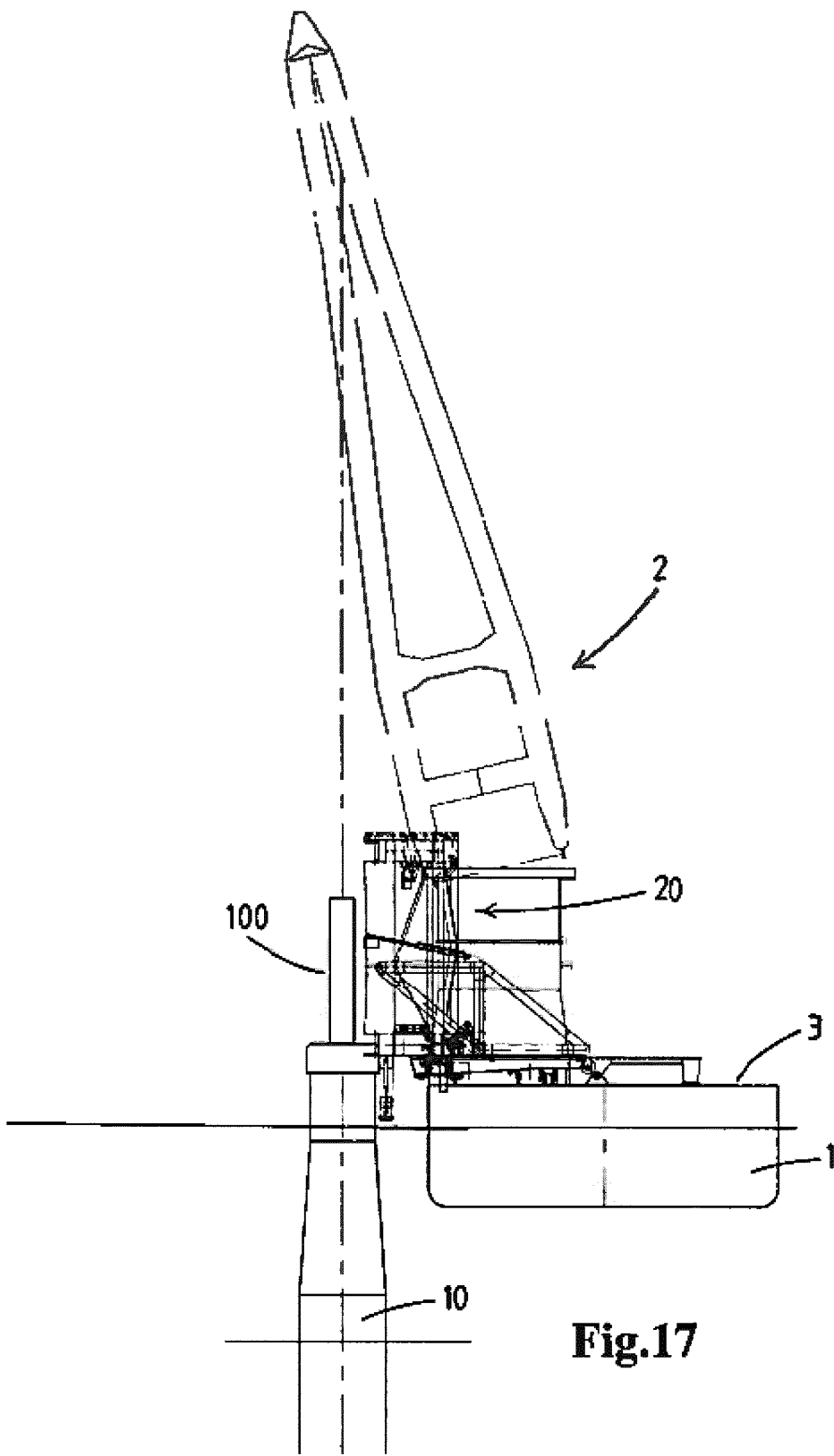
FIG. 17 illustrates placing a pile driving device on top of the pile for driving the pile deeper into the seabed, and driving said pile into the seabed until a desired penetrating depth is achieved guided by the system of FIG. 1a, FIG. 18 illustrates the system after an emergency ejection of the monopile from the pile holder, FIGS. 19,20 schematically illustrate pile engaging devices of the system engaging piles of different diameters.

FIG. 15 illustrates the foot end support 70 being disengaged according to step f in three stages, and in the lowermost part during step g. FIG. 16 illustrates the system during step g and FIG. 17 after step g, while a pile driving hammer is placed onto the second longitudinal end portion of the pile 10 for consequent pile driving.

The support assembly 30 provides compensation for wave-induced motion of the vessel to maintain a predetermined X-Y location of the pile holder independent of the wave-induced motion of the vessel at least in step g.

Figure 22D:
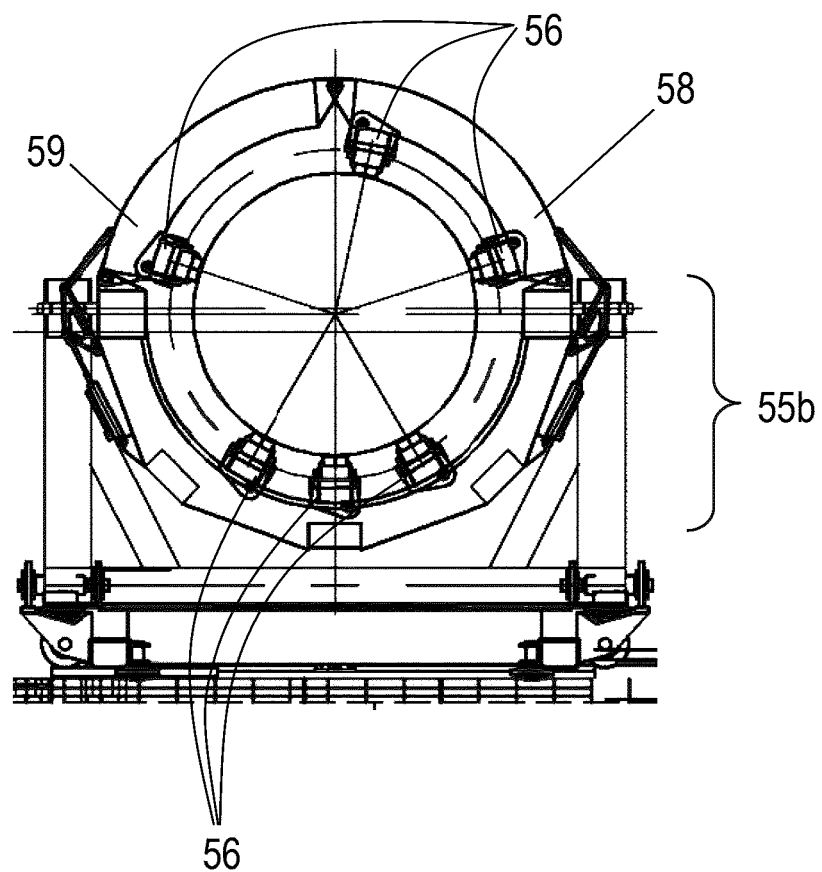
FIG. 22d illustrates in a front view the system with the pile holder in a horizontal orientation.

In FIG. 22d, another use of the angular movability of the pile engaging devices 56, 61 is shown. In the horizontal orientation, a part of the devices may be moved towards the bottom part of the ring bases, so that the pile 10 is supported vertically by multiple pile engaging devices in this orientation. The devices 56, 61 may later be moved to be more evenly distributed over the circumference in the vertical orientation.

The invention claimed is:

1. A vessel for upending and installation of a pile in a seabed, the vessel comprising a pile upending and holding system that is mounted on the vessel, the vessel having an X-direction running horizontally along a length of the vessel and a Y-direction running horizontally transverse to the X-direction, wherein the pile upending and holding system comprises:

a support assembly mounted on the vessel; and a pile holder that is tiltable mounted on the support assembly, wherein the pile holder is tiltable about a horizontal tilt axis relative to the support assembly between a horizontal orientation, in which the pile holder is able to hold the pile in a horizontal orientation, and a vertical orientation, wherein the pile holder comprises:

a lower ring;

an upper ring; and a pile holder frame supporting the lower ring and the upper ring, the upper ring being vertically above the lower ring when the pile holder is in a vertical orientation, wherein each of the lower ring and the upper ring comprises multiple pile engaging devices that are distributed about the circumference of the respective ring, each pile engaging device being adapted to engage an exterior of the pile extending through the lower and upper ring, wherein each of the lower ring and the upper ring comprises a ring base that is fixed to the pile holder frame and further comprises one or more movable jaws, each jaw being movable between a closed position, wherein the respective ring forms a closed annulus, and an opened position, wherein the pile holder is provided, below the lower ring thereof, with a pile foot end support that is secured to the pile holder frame and that is configured to engage with a foot end of the pile at a first longitudinal end portion of the pile in order to limit longitudinal movement of the pile, at least during upending of the pile, and wherein the support assembly is configured to initially support the pile holder while holding the pile having a weight exceeding 1000 tonnes (106 kg) in the horizontal orientation, during upending of the pile, wherein a second longitudinal end portion of the pile is lifted by a lifting device into the vertical orientation, continue to support the pile holder while holding the first longitudinal end portion of the pile in the foot end support and support the pile holder while holding the pile during tilting about the horizontal tilt axis, continue to support the pile holder during disengaging of the pile foot end from the pile foot end support, the weight of the pile being held by the lifting device, and continue to support the pile holder during lowering of the pile into the water while being held and guided by the pile guiding rollers of the pile holder, the weight of the pile being held by the lifting device, the support assembly providing compensation for motion of the vessel to maintain a predetermined X-Y location of the pile holder independent of the motion of the vessel.

2. The vessel according to claim 1, wherein the horizontal tilt axis is, in the vertical orientation of the pile holder, located in the X-direction further forward from a location at which the support assembly is mounted to the vessel than the center axis of the pile holder.

3. The vessel according to claim 1, wherein the horizontal tilt axis is located between the lower ring and the upper ring.

4. The vessel according to claim 1, wherein the support assembly comprises one or more Y-rails extending in the Y-direction mounted on the vessel, a positioning frame movably supported on said one or more Y-rails in said Y-direction, wherein the positioning frame is provided with one or more X-rails extending horizontally in the X-direction, and a support frame movably supported on said one or more X-rails in said X-direction, and wherein the pile holder is tiltable supported by the support frame about the horizontal tilt axis.

5. The vessel according to claim 1, wherein the support assembly is provided, spaced from the horizontal tilt axis along the center line, with a catching and retarding mechanism, the catching and retarding mechanism being configured to, in a range of angles of the center axis from a predetermined backward tilting angle to a vertical orientation, engage the pile holder and apply a force to the pile holder longitudinally spaced from the horizontal tilt axis, such as to decelerate a tilting movement of the pile holder and the pile held thereby.

6. The vessel according to claim 1, wherein the lower pile engaging devices and/or the upper pile engaging devices are movable in at least a radial direction relative to the respective ring structure.

7. The vessel according to claim 6, wherein the lower pile engaging devices and/or the upper pile engaging devices are actively radially movable by one or more respective actuators of the respective ring such as to engage and/or disengage the pile and/or to, while engaging the pile, adjust a position of the pile relative to the respective ring in a radial plane.

8. The vessel according to claim 6, wherein the upper pile engaging devices and/or the lower pile engaging devices are configured to absorb radial motions of the pile within the respective ring.

9. The vessel according to claim 1, wherein a passive ring damping mechanism is provided in at least one of the lower ring and the upper ring of the pile holder between the pile engaging devices of the respective ring and the ring structure thereof.

10. The vessel according to claim 1, wherein the pile engaging devices of at least one of the lower ring and the upper ring are movable relative to the ring structure of the respective ring along a respective arc segment of the ring, so as to allow for adaptation of an angular position of the pile engaging devices relative to the ring structure of the ring.

11. The vessel according to claim 10, wherein the pile engaging devices of the upper ring have a fixed angular position relative to the ring structure of the upper ring.

12. The vessel according to claim 1, wherein the pile foot end support comprises one or more pivotal arms that are movable into an operative position wherein the one or more pivotal arms extend underneath a longitudinal end portion of the pile and an opened position wherein the one or more pivotal arms are cleared from the longitudinal end portion of the pile.

13. A vessel for upending and installation of a pile in a seabed, the vessel comprising a pile upending and holding system that is mounted on the vessel, the vessel having an X-direction running horizontally along a length of the vessel and a Y-direction running horizontally transverse to the X-direction,
wherein the pile upending and holding system comprises:
a support assembly mounted on the vessel; and
a pile holder having a center axis and being mounted on the support assembly such as to be tiltable about a horizontal tilt axis relative to the support assembly, so that the pile holder, while holding the pile longitudinally along the center axis, is tiltable between:
a horizontal orientation, in which the center axis is horizontal; and
a vertical orientation, in which the center axis is vertical,
wherein the pile holder comprises:
a lower ring;
an upper ring; and
a pile holder frame supporting the lower ring and upper ring mutually spaced along the center axis,
wherein each of the lower ring and the upper ring comprises a ring structure, comprising a ring base that is fixed to the pile holder frame and one or more movable jaws the jaws being movable such as to adjust the rings between:
an opened position, in which each of the rings between free ends of the respective ring base defines an entry opening of the pile holder for entry of the pile into the pile holder to extend through the lower and upper rings with a longitudinal axis of the pile extending along the center axis; and
a closed position, wherein the rings each form a closed annulus enclosing the pile extending through the rings,
wherein the lower ring comprises multiple lower pile engaging devices and the upper ring comprises multiple upper pile engaging devices, the pile engaging devices of each respective ring being connected to the ring structure of the ring, distributed about the circumference of the ring, each pile engaging device being adapted to engage an exterior of the pile extending through the lower and upper rings, such as to hold the pile longitudinally along the center axis and guide the pile while it moves along the center axis,
wherein the pile holder is provided, below the lower ring thereof, with a pile foot end support that is secured to the pile holder frame and that is configured to engage with a first longitudinal end portion of the pile in order to limit longitudinal movement of the pile, at least during upending of the pile, and
wherein the support assembly is configured to
initially support the pile holder while holding the pile having a weight exceeding 1000 tonnes (106 kg) in the horizontal orientation,
during upending of the pile, wherein a second longitudinal end portion of the pile is lifted by a lifting device into the vertical orientation, continue to support the pile holder while holding the first longitudinal end portion of the pile in the foot end support and support the pile holder while holding the pile during tilting about the horizontal tilt axis,
continue to support the pile holder during disengaging of the pile foot end from the pile foot end support, the weight of the pile being held by the lifting device,
continue to support the pile holder during lowering of the pile into the water while being held and guided by the pile guiding rollers of the pile holder, the weight of the pile being held by the lifting device, the support assembly providing compensation for motion of the vessel to maintain a predetermined X-Y location of the pile holder independent of the motion of the vessel.

14. The vessel according to claim 13, wherein the horizontal tilt axis is, in the vertical orientation of the pile holder, located in the X-direction further forward from a location at which the support assembly is mounted to the vessel than the center axis of the pile holder.

15. The vessel according to claim 13, wherein the horizontal tilt axis is located between the lower ring and the upper ring.

16. The vessel according to claim 13, wherein the support assembly comprises one or more Y-rails extending in the Y-direction mounted on the vessel, a positioning frame movably supported on said one or more Y-rails in said Y-direction, wherein the positioning frame is provided with one or more X-rails extending horizontally in the X-direction, and a support frame movably supported on said one or more X-rails in said X-direction, and wherein the pile holder is tiltable supported by the support frame about the horizontal tilt axis.

17. The vessel according to claim 13, wherein the support assembly is provided, spaced from the horizontal tilt axis along the center line, with a catching and retarding mechanism, the catching and retarding mechanism being configured to, in a range of angles of the center axis from a predetermined backward tilting angle to a vertical orientation, engage the pile holder and apply a force to the pile holder longitudinally spaced from the horizontal tilt axis such as to decelerate a tilting movement of the pile holder and the pile held thereby.

18. The vessel according to claim 13, wherein the lower pile engaging devices and/or the upper pile engaging devices are movable in at least a radial direction relative to the respective ring structure.

19. The vessel according to claim 13, wherein a passive ring damping mechanism is provided in at least one of the lower ring and the upper ring of the pile holder between the pile engaging devices of the respective ring and the ring structure thereof.

20. A method for upending and installation of a pile in a seabed at an offshore installation site, wherein use is made of the vessel according to claim 1, wherein the method comprises, with the vessel in a floating condition at the offshore installation site:

a. transporting a pile in a horizontal orientation to the offshore installation site;
b. opening the one or more jaws of each of the lower ring and the upper ring;
c. with the pile holder in the horizontal orientation, placing the pile in horizontal orientation with a first longitudinal end portion thereof on the base of each of the lower ring and the upper ring;
d. closing the one or more jaws of both rings;
e. upending the pile into vertical orientation by means of lifting a second longitudinal end portion of the pile, so that the pile held at the first longitudinal end portion thereof by the pile holder tilts about the horizontal tilt axis, wherein the pile foot end support limits longitudinal movement of the pile, during the upending of the pile;
f. disengaging the pile foot end support from the first longitudinal end portion of the pile; and
g. lowering the pile into the water while being held and guided by the pile engaging devices of the pile holder, wherein the support assembly provides compensation for motion of the vessel to maintain a predetermined X-Y location of the pile holder independent of the motion of the vessel at least in step g.

* * * * *